(12) United States Patent
Zhang et al.

(10) Patent No.: US 11,429,850 B2
(45) Date of Patent: Aug. 30, 2022

(54) PERFORMING CONSECUTIVE MAC OPERATIONS ON A SET OF DATA USING DIFFERENT KERNELS IN A MAC CIRCUIT

(71) Applicant: Xilinx, Inc., San Jose, CA (US)

(72) Inventors: Xiaoqian Zhang, San Jose, CA (US); Ephrem C. Wu, San Mateo, CA (US); David Berman, San Jose, CA (US)

(73) Assignee: XILINX, INC., San Jose, CA (US)

( * ) Notice: Subject to any disclaimer, the term of this patent is extended or adjusted under 35 U.S.C. 154(b) by 1077 days.

(21) Appl. No.: 16/040,357

(22) Filed: Jul. 19, 2018

(65) Prior Publication Data
US 2020/0026989 A1    Jan. 23, 2020

(51) Int. Cl.
G06N 3/063 (2006.01)
G06F 7/544 (2006.01)
G06F 9/38 (2018.01)
G06F 9/54 (2006.01)
G06F 12/0875 (2016.01)
G06N 3/04 (2006.01)

(52) U.S. Cl.
CPC ........... G06N 3/063 (2013.01); G06F 7/5443 (2013.01); G06F 9/3885 (2013.01); G06F 9/545 (2013.01); G06F 12/0875 (2013.01); G06N 3/04 (2013.01)

(58) Field of Classification Search
None
See application file for complete search history.

(56) References Cited

U.S. PATENT DOCUMENTS

| 9,779,786 | B1 | 10/2017 | Wu et al. |
| 11,086,967 | B2* | 8/2021 | Redfern ............... G06F 17/141 |
| 2016/0210550 | A1* | 7/2016 | Merrill ................ G06N 3/0454 |
| 2017/0103299 | A1* | 4/2017 | Aydonat ............ G06N 3/0454 |
| 2018/0189424 | A1 | 7/2018 | Boesch et al. |

FOREIGN PATENT DOCUMENTS

WO    2017129325    8/2017

OTHER PUBLICATIONS

Moons, B. et al., An Energy-Efficient Precision-Scalable ConvNet Processor in 40-nm CMOS 2017, IEEE, IEEE Journal of Solid State Circuits vol. 52, No. 4, 12 pages. (Year: 2017).*
Gray, S. et al., GPU Kernels for Block Sparse, 2017, Weights,openai. com, 12 pages. (Year: 2017).*

(Continued)

*Primary Examiner* — Eric Coleman
(74) *Attorney, Agent, or Firm* — Crawford Maunu PLLC

(57) ABSTRACT

A circuit arrangement includes an array of MAC circuits, wherein each MAC circuit includes a cache configured for storage of a plurality of kernels. The MAC circuits are configured to receive a first set of data elements of an IFM at a first rate. The MAC circuits are configured to perform first MAC operations on the first set of the data elements and a first one of the kernels associated with a first OFM depth index during a first MAC cycle, wherein a rate of MAC cycles is faster than the first rate. The MAC circuits are configured to perform second MAC operations on the first set of the data elements and a second one of the kernels associated with a second OFM depth index during a second MAC cycle that consecutively follows the first MAC cycle.

20 Claims, 14 Drawing Sheets

(56) References Cited

OTHER PUBLICATIONS

Palero, Ricardo Colom, et al., A Novel FPGA Architecture of a 2-D Wavelet Transform, 2006, Springer Science and Business Media, Inc., pp. 273-284. (Year: 2006).*

Wang et al., PipeCNN: A OpenCL-Based Open-Source FPGA Accelerator for Convolution Neural Networks,2017,IEEE,pp. 279-282. (Year: 2017).*

Ma, Y, et al., Scalable and Modularized RTL Compilation of Convolutional Neural Networks onto FPGA., 2016,IEEE, 8 pages. (Year : 2016).*

Sze, Vivienne et al., "Efficient Processing of Deep Neural Networks: A Tutorial and Survey," Proceedings of the IEEE, Dec. 2017, pp. 2295-2329, vol. 105, No. 12, IEEE, Piscataway, New Jersey, USA.

Kyrkou, Christos, "Stream Processors and GPUs: Architectures for High Performance Computing," Survey on Stream Processors and and Graphics Processing Units, 2009, pp. 1-15.

\* cited by examiner

FIG. 5A

*MUL*[r, c, 0,0,0,0], *MUL*[r, c, 0,1,0,0], *MUL*[r, c, 0,1,0,0], ..., *MUL*[r, c, 2,2,0,0],
*MUL*[r, c, 0,0,0,1], *MUL*[r, c, 0,1,0,1], *MUL*[r, c, 0,1,0,1], ..., *MUL*[r, c, 2,2,0,1],
*MUL*[r, c, 0,0,0,2], *MUL*[r, c, 0,1,0,2], *MUL*[r, c, 0,1,0,2], ..., *MUL*[r, c, 2,2,0,2],
*MUL*[r, c, 0,0,0,3], *MUL*[r, c, 0,1,0,3], *MUL*[r, c, 0,1,0,3], ..., *MUL*[r, c, 2,2,0,3],
...
*MUL*[r, c, 0,0,16,0], *MUL*[r, c, 0,1,16,0], *MUL*[r, c, 0,1,16,0], ..., *MUL*[r, c, 2,2,16,0],
*MUL*[r, c, 0,0,16,1], *MUL*[r, c, 0,1,16,1], *MUL*[r, c, 0,1,16,1], ..., *MUL*[r, c, 2,2,16,1],
*MUL*[r, c, 0,0,16,2], *MUL*[r, c, 0,1,16,2], *MUL*[r, c, 0,1,16,2], ..., *MUL*[r, c, 2,2,16,2],
*MUL*[r, c, 0,0,16,3], *MUL*[r, c, 0,1,16,3], *MUL*[r, c, 0,1,16,3], ..., *MUL*[r, c, 2,2,16,3]

FIG. 5B

*MUL*[r, c, 0,0,0,0], *MUL*[r, c, 0,0,0,1], ..., *MUL*[r, c, 0,0,0,3],
*MUL*[r, c, 0,1,0,0], *MUL*[r, c, 0,1,0,1], ..., *MUL*[r, c, 0,1,0,3],
*MUL*[r, c, 0,2,0,0], *MUL*[r, c, 0,2,0,1], ..., *MUL*[r, c, 0,2,0,3],
...
*MUL*[r, c, 0,0,16,0], *MUL*[r, c, 0,0,16,1], ..., *MUL*[r, c, 0,0,16,3],
*MUL*[r, c, 0,1,16,0], *MUL*[r, c, 0,1,16,1], ..., *MUL*[r, c, 0,1,16,3],
*MUL*[r, c, 0,2,16,0], *MUL*[r, c, 0,2,16,1], ..., *MUL*[r, c, 0,2,16,3],
...
*MUL*[r, c, 2,1,0,0], *MUL*[r, c, 2,1,0,1], ..., *MUL*[r, c, 2,1,0,3],
*MUL*[r, c, 2,2,0,0], *MUL*[r, c, 2,2,0,1], ..., *MUL*[r, c, 2,2,0,3],
...
*MUL*[r, c, 2,1,16,0], *MUL*[r, c, 2,1,16,1], ..., *MUL*[r, c, 2,1,16,3],
*MUL*[r, c, 2,2,16,0], *MUL*[r, c, 2,2,16,1], ..., *MUL*[r, c, 2,2,16,3]

FIG. 5C

*MAC*[r, c, 0,0,0,0], *MAC*[r, c, 0,0,16,0], *MAC*[r, c, 0,1,0,0], ..., *MAC*[r, c, 2,2,0,0],
*MAC*[r, c, 0,0,0,1], *MAC*[r, c, 0,0,16,1], *MAC*[r, c, 0,1,0,1], ..., *MAC*[r, c, 2,2,0,1],
*MAC*[r, c, 0,0,0,2], *MAC*[r, c, 0,0,16,2], *MAC*[r, c, 0,1,0,2], ..., *MAC*[r, c, 2,2,0,2],
*MAC*[r, c, 0,0,0,3], *MAC*[r, c, 0,0,16,3], *MAC*[r, c, 0,1,0,3], ..., *MAC*[r, c, 2,2,0,3],
...

FIG. 5D

*MAC*[r, c, 0,0,0,0], *MAC*[r, c, 0,0,0,1], *MAC*[r, c, 0,0,0,3], *MAC*[r, c, 0,0,16,0], *MAC*[r, c, 0,0,16,1], *MAC*[r, c, 0,0,16,3], ...
*MAC*[r, c, 0,1,0,0], *MAC*[r, c, 0,1,0,1], *MAC*[r, c, 0,1,0,3], *MAC*[r, c, 0,1,16,0], *MAC*[r, c, 0,1,16,1], *MAC*[r, c, 0,1,16,3], ...
*MAC*[r, c, 0,2,0,0], *MAC*[r, c, 0,2,0,1], *MAC*[r, c, 0,2,0,3], *MAC*[r, c, 0,2,16,0], *MAC*[r, c, 0,2,16,1], *MAC*[r, c, 0,2,16,3], ...
...
*MAC*[r, c, 2,1,0,0], *MAC*[r, c, 2,1,0,1], *MAC*[r, c, 2,1,0,3], *MAC*[r, c, 2,1,16,0], *MAC*[r, c, 2,1,16,1], *MAC*[r, c, 2,1,16,3], ...
*MAC*[r, c, 2,2,0,0], *MAC*[r, c, 2,2,0,1], *MAC*[r, c, 2,2,0,3], *MAC*[r, c, 2,2,16,0], *MAC*[r, c, 2,2,16,1], *MAC*[r, c, 2,2,16,3]

PERFORMING CONSECUTIVE MAC OPERATIONS ON A SET OF DATA USING DIFFERENT KERNELS IN A MAC CIRCUIT

TECHNICAL FIELD

The disclosure generally relates to performing multiply-and-accumulate (MAC) operations on a set of data using different kernels during consecutive MAC cycles of an array of MAC circuits.

BACKGROUND

Processing circuitry, such as neural networks, provide solutions to a variety of different problems. Convolutional neural networks (CNNs), for example, may be used for image processing. CNNs can be implemented using Graphics Processing Units (GPUs) and use a batch processing approach to reduce computational costs by grouping a number of similar tasks and computing the group of tasks as a batch. A batch of tasks can be computed by using multiple streaming processor (SP) cores inside a scalable number of streaming multiprocessors (SMs) in parallel. The implementation costs of a controller of the GPU may be amortized over a number of tasks, however, the latency of the CNN will increase as the batch size increases because the GPU has to wait for all tasks to be ready before processing the tasks together in batch mode in order to maintain the computational efficiency of the CNN.

There are a variety of different circuits that can implement CNNs including, but not limited to, digital signal processors (DSPs), general purpose computer processors, programmable integrated circuits, programmable logic devices (PLDs), and System on Chip (SoC) devices. PLDs are a type of programmable integrated circuit (IC) that can be programmed to perform specified logic functions. One type of PLD, the field programmable gate array (FPGA), can include an array of programmable tiles. These programmable tiles comprise various types of logic blocks, which can include, for example, input/output blocks (IOBs), configurable logic blocks (CLBs), dedicated block random access memory (BRAM), multipliers, digital signal processing blocks (DSPs), processors, clock managers, delay locked loops (DLLs), bus or network interfaces such as Peripheral Component Interconnect (PCI), PCI Express (PCIe), Ethernet, and so forth. Some devices include enough components and functionality to effectively serve as an entire computer system on a single IC chip. Devices with such functionality are sometimes referred to as SoCs. Some SoC devices can include programmable logic that is similar to programmable logic provided by various PLDs.

Prior implementations often suffer from bottlenecks between processing units and memory. Therefore, data might not be provided fast enough to fully utilize the processing circuits.

SUMMARY

A circuit arrangement includes an array of multiply-and-accumulate (MAC) circuits, wherein each MAC circuit includes a cache configured for storage of a plurality of kernels. The MAC circuits are configured to receive a first set of data elements of an input feature map (IFM) at a first rate. The MAC circuits are configured to perform first MAC operations on the first set of the data elements and a first one of the kernels (H) associated with a first output feature map (OFM) depth index ($d_2$) during a first MAC cycle, wherein a rate of MAC cycles is faster than the first rate. The MAC circuits are configured to perform second MAC operations on the first set of the data elements and a second one of the kernels (H) associated with a second OFM depth index ($d_2$) during a second MAC cycle that consecutively follows the first MAC cycle.

A method includes inputting a first set of data elements of an input feature map (IFM) at a first rate to an array of multiply-and-accumulate (MAC) circuits. The method includes during a first MAC cycle, performing, by the MAC circuits, first MAC operations on the first set of the data elements and a first kernel (H) stored in a cache of the MAC circuits, wherein the first kernel is associated with a first output feature map (OFM) depth index ($d_2$), wherein a rate of MAC cycles is faster than the first rate. The method includes during a second MAC cycle that consecutively follows the first MAC cycle, performing, by the MAC circuits, second MAC operations on the first set of the data elements and a second kernel (H) stored in the cache of the MAC circuits, wherein the second kernel is associated with a second OFM depth index ($d_2$).

Other features will be recognized from consideration of the Detailed Description and Claims, which follow.

BRIEF DESCRIPTION OF THE DRAWINGS

Various aspects and features of the circuit arrangement and method will become apparent upon review of the following detailed description and upon reference to the drawings in which:

FIG. 5A shows the multiplication output value MUL sequence of the lower left MAC circuit for the first OFM pass $p_o=0$ iterated by the row and column indices (u,v) of the kernel;

FIG. 5B shows the multiplication output value MUL sequence of the lower left MAC circuit for the first OFM pass $p_o=0$ iterated by the IFM phase index $n_i$;

FIG. 5C shows the accumulation output value MAC sequence for the upper left MAC circuit of the first OFM pass $p_o=0$ iterated by the row and column indices (u,v) of the kernel;

FIG. 5D shows the accumulation output value MAC sequence for the upper left MAC circuit of the first OFM pass $p_o=0$ iterated by the IFM phase index $n_i$;

Figures 6A, 6B:
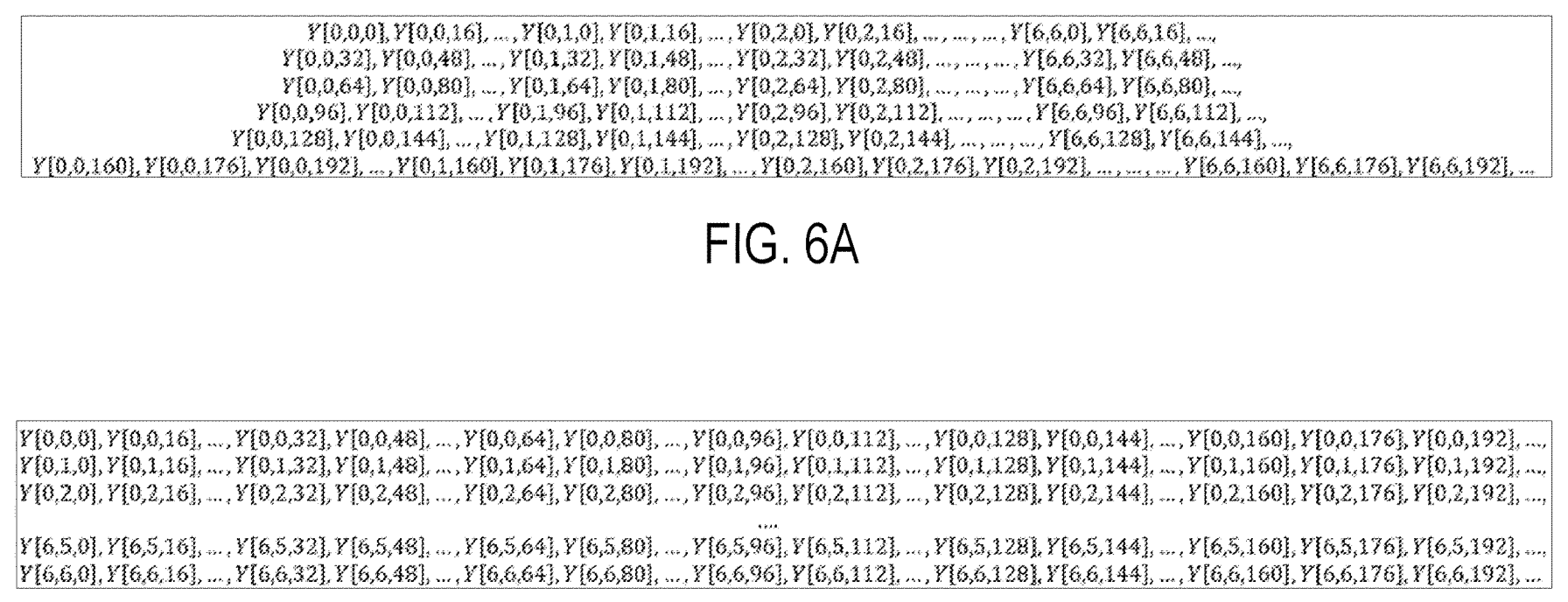

FIG. 6A shows the OFM output sequence of the left most accumulators iterated by the row and column indices (r,c) of the OFM;

FIG. 6B shows the OFM output sequence of the left most accumulators iterated by the OFM depth index $d_2$;

DETAILED DESCRIPTION

Figure 1:
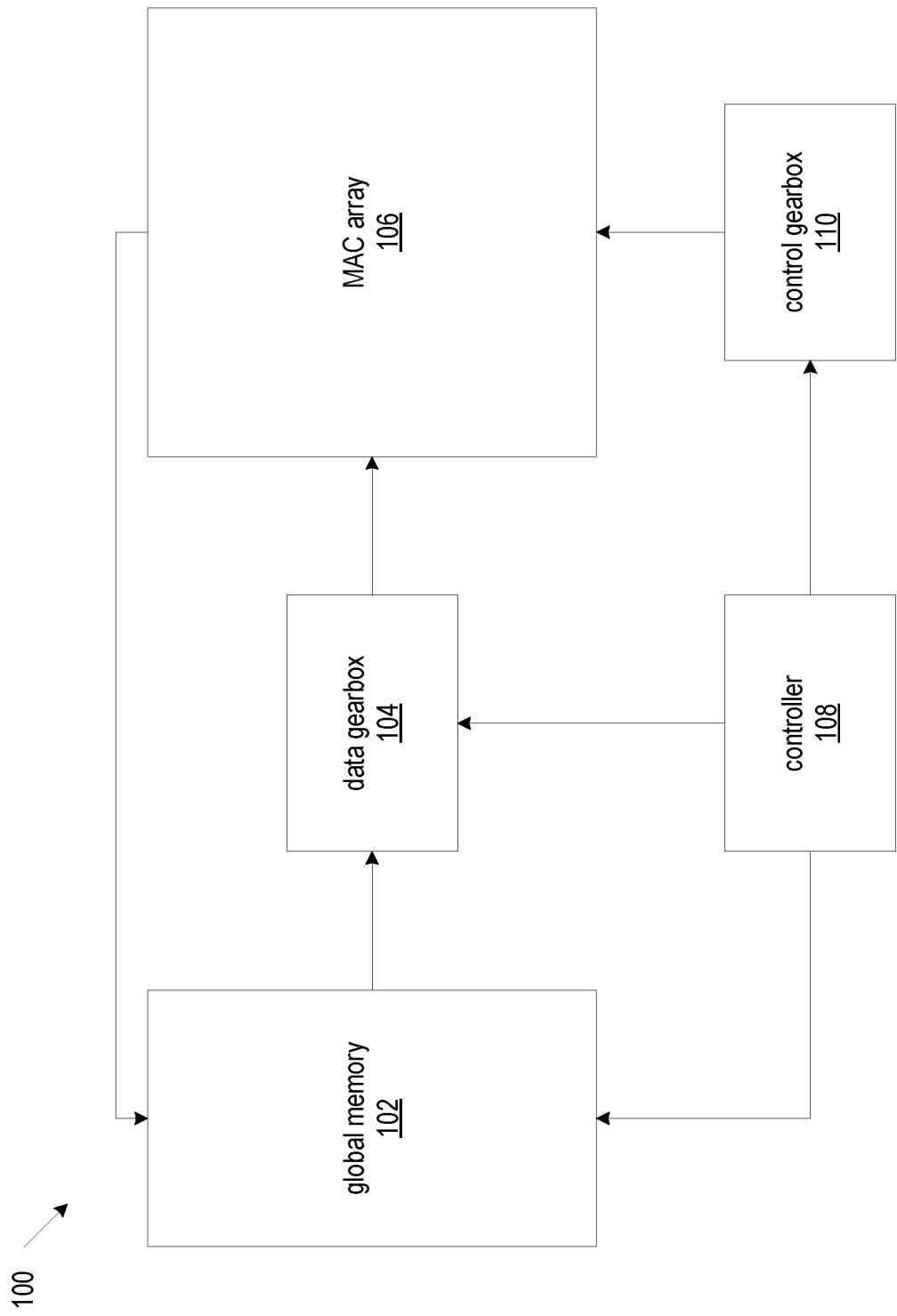
FIG. 1 shows a block diagram of an exemplary circuit arrangement including a controller, a control gearbox, a data gearbox, and an array of MAC circuits.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Improving the computational efficiency of a neural network, such as a convolutional neural network (CNN), can be accompanied by increased computational complexity and computational speed. The computational efficiency can be improved by using a controller that operates at a frequency equal to the computational speed of the multiply-and-accumulate (MAC) circuits of the neural network, which enables the MAC circuits to be kept as busy as possible. However, to accommodate the speed of the MAC circuits, the controller has to be capable of handling the complexity of address generation, which is proportional to the computational complexity of the MAC circuits. Increasing both the logic complexity and speed of the controller increases the cost of implementation exponentially. However, even if the logic of the control circuit operates at the MAC rate, the rate at which data is provided by the controller to the MAC circuits may be limited by other circuits, such as memory.

The disclosed circuit arrangements and methods provide approaches for keeping an array of MAC circuits of a CNN as busy as possible while operating at a MAC processing frequency (hereinafter referred to as MAC rate) while maintaining a slower operating frequency of a controller of the MAC circuits. The MAC rate can be based on a clock signal provided to the MAC circuits. Convolutional (CONV) and fully connected (FC) layers of a CNN perform MAC operations. Various other arithmetic operations can be performed in other layers of the CNN, such as rectified linear unit (ReLU), pooling, and normalization. As used herein, "MAC circuits" refer to a combination of a multiplier circuit, an accumulator circuit, and a cache configured for storage of kernels to be used in the MAC operations. Because convolution operations can be performed in parallel, an array of MAC circuits can be used to perform the convolution operations in parallel and increase the computational speed of the CNN. To maximize the throughput of the array, the processing cycles of the MAC circuits (hereinafter referred to as MAC cycles) are fully utilized and the MAC rate is maximized.

The increased computational efficiency of the disclosed approaches increases the complexity of address and control patterns provided to the MAC circuits. Implementations of the disclosed approaches include one or more control circuit(s) that generate specialized address patterns for the array to read data from and/or write data to a global memory and/or cache of the MAC circuits. The control circuits generate specialized control patterns for addressing data and timing operations of the MAC circuits.

The disclosed approaches time-division multiplex a number (M) of parallel threads in each MAC circuit by splitting the activation feature depth. A control circuit (or "controller") generates address and control patterns for the M threads at the MAC rate. As used herein, "thread" refers to the computation of a value at a depth index of an output feature map. The address and control patterns are converted by another control circuit, hereinafter referred to as a control gearbox, into memory address(es) directly mapped to the cache of the MAC circuit, and the address and control pattern are updated every processing cycle of the MAC circuit. Another control circuit, hereinafter referred to as a data gearbox, adapts the rate at which data read is from a memory to another rate at which the data is provided to the MAC circuits. In some instances, the data gearbox provides the data to the MAC circuits at a slower rate than the rate at which the data is read. In some instances, the rate at which the control gearbox and the data gearbox provide control words, addresses, and data to the MAC circuits changes dynamically depending on the number (M) of parallel threads interleaved in the MAC circuits at a given point in time. For example, the disclosed approaches can switch from interleaving two parallel threads in the MAC circuits to three parallel threads in the MAC circuits and vice versa.

Addresses for multiple kernels are stored interleaved in the cache of each of the MAC circuits so that multiple, consecutive MAC operations to be performed on a set of data elements during consecutive MAC cycles. The MAC operations are performed at a faster rate than the rate at which the data, control words, and addresses are provided to the MAC circuits, but the operating frequency of the controller remains constant. The controller operates at a frequency directly proportional (e.g., 1/M) to the MAC rate.

The disclosed approaches estimate the initial logic depth for a control circuit from latency (e.g., cycle time tradeoff) to provide balanced pipelines and ease retiming.

FIG. 1 shows a block diagram of an exemplary circuit arrangement 100 including a controller 108, a control gearbox 110, a data gearbox 104, and an array 106 of MAC circuits. The controller 108 generates address patterns for data access from and to a global memory 102. The data gearbox 104 is coupled to the global memory 102 and the array 106 of MAC circuits. The data gearbox 104 performs rate adaptation between the controller 108 and the array 106 with respect to data read from the global memory 102. The control gearbox 110 is coupled to the controller 108 and the array 106. The control gearbox 110 performs rate adaptation between the controller 108 and the array 106 with respect to addresses and control words from the controller 108. Data output from the array 106 is written to the global memory 102. Exemplary operation of the data gearbox 104, control gearbox 110, and the array 106 are described in association with FIGS. 4-12 below.

Figure 2:
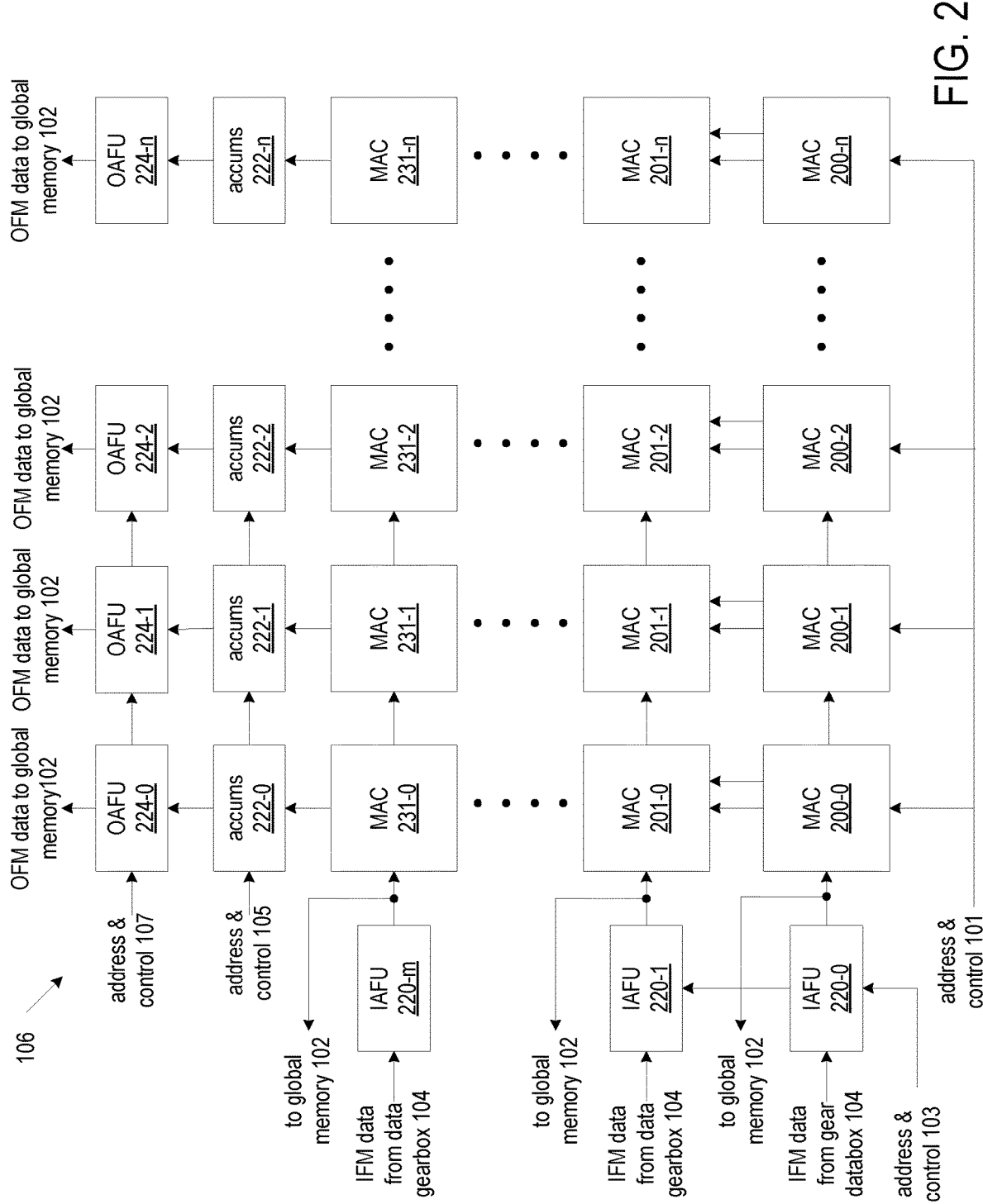
FIG. 2 shows a block diagram of an exemplary array of MAC circuits.

FIG. 2 shows a block diagram of an exemplary array of MAC circuits. The array illustrated in FIG. 2 can be analogous to the array 106 illustrated in FIG. 1. The array 106 includes MAC circuits arranged in m+1 rows and n+1 columns. Row 0 of the array 106 includes the MAC circuits 200-0, 200-1, 200-2, . . . 200-$n$; row 1 of the array 106 includes the MAC circuits 201-0, 201-1, 201-2, . . . 201-$n$; and row m of the array 106 includes the MAC circuits 231-0, 231-1, 231-2, . . . 231-$n$.

In at least one implementation of the present disclosure, each column of the array 106 includes M context switching parallel accumulators coupled to a respective topmost MAC circuit of a column that are dedicated to M time-division multiplexed threads. The accumulators 222-0 are coupled to the MAC circuit 231-0 of column 0 of the array 106; the accumulators 222-1 are coupled to the MAC circuit 231-1 of column 1; the accumulators 222-2 are coupled to the MAC circuit 231-2 of column 2; and the accumulators 222-n are coupled to the MAC circuit 231-n of column n. Each accumulator stores and sums each accumulated partial dot product value for each thread from the array 106 together to get a final dot product value for each thread.

In at least one implementation, an output activation function unit (OAFU) is coupled to the accumulators of a respective column of the array 106. The OAFU 224-0 is coupled to the accumulators 222-0; the OAFU 224-1 is coupled to the accumulators 224-1; the OAFU 224-2 is coupled to the accumulators 222-2; and the OAFU 224-n is coupled to the accumulators 222-n. Each OAFU applies one or more activation functions, such as ReLU, pooling, and normalization, to the values output from the accumulators. The output of the OAFUs can be transferred to global memory, such as the global memory 102 illustrated in FIG. 1.

In at least one implementation, each row of the array 106 includes an input activation function unit (IAFU) coupled to a leftmost MAC circuit of a row. The IAFU 220-0 is coupled to the MAC circuit 200-0 of row 0 of the array; the IAFU 220-1 is coupled to the MAC circuit 201-0 of row 1; and the IAFU 220-m is coupled to the MAC circuit 231-0 of row m. Each IAFU applies one or more activation functions to data read from the global memory 102. The data can be IFM data provided to the IAFUs by the data gearbox 104 illustrated in FIG. 1. The IAFUs can be enabled when the OAFUs are bypassed or pooling operations are applied to both data input to the MAC circuits and data output from the MAC circuits. The outputs from the IAFUs can be transferred directly to the MAC circuits or transferred (e.g., looped) back to the global memory 102. Looping back to the global memory 102 is discussed further in association with FIG. 13 below. If the IAFUs are bypassed, the input data is fed directly into the MAC circuits.

As shown in FIG. 2, data input to the array 106 is shifted horizontally from left to right to each MAC circuit of a row. The accumulated values output from the MAC circuits are shifted vertically from bottom to top through the MAC circuits of a column.

A control gearbox, such as the control gearbox 110, provides address & control 101 to the array to perform kernel access and MAC operations for each thread. Address & control 101 is shared by all of the MAC circuits and is shifted each MAC cycle from bottom to top and left to right. Address & control 103 is shifted vertically each MAC cycle from bottom to top and is shared by all IAFUs. Address & control 105 is shifted horizontally each MAC cycle from left to right and is shared by all accumulators to control context switching between the M parallel accumulators. Address & control 107 is shifted horizontally each MAC cycle from left to right and is shared by all OAFUs.

The arrangement and size of the block diagram and the components thereof illustrated in FIG. 2 does not limit the arrangement or size of the physical components of the array 106. Although FIG. 2 illustrates data flow from left to right and bottom to top, implementations of the present disclosure are not so limited.

Figure 3:
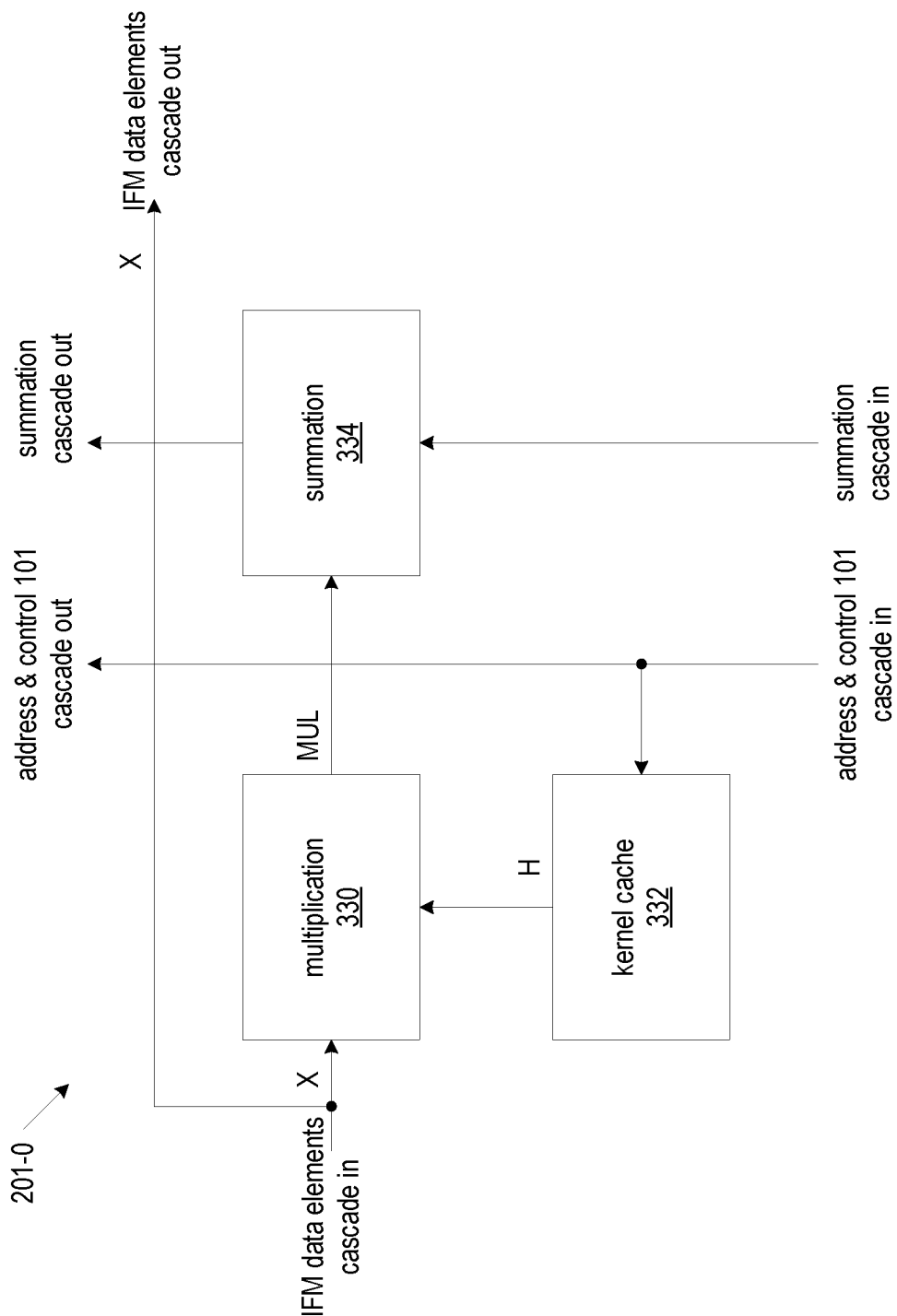
FIG. 3 shows a block diagram of an exemplary MAC circuit of the array of MAC circuits of FIG. 2.

FIG. 3 shows a block diagram of an exemplary MAC circuit of the array of MAC circuits of FIG. 2. Although FIG. 3 illustrates the MAC circuit 201-0 of the array 106, the structure illustrated in FIG. 3 is applicable to each MAC circuit of the array 106. The MAC circuit 201-0 includes a multiplication circuit 330, a summation circuit 334, and a kernel cache 332. The multiplication circuit 330 and summation circuit 334 cooperate to perform a MAC operation. The multiplication circuit 330 outputs multiplication output value MUL of the data input X to the MAC circuit 201-0 and a kernel H read from the kernel cache 332. The data X is either data from the global memory 102 or the output of the IAFU 220-1. The data X is shifted to the right-adjacent MAC circuit (e.g., 201-1) of row 1. The kernel H includes weights for a particular MAC operation. The address & control 103 is provided to the MAC circuit 201-1 by the control gearbox 110 for reading the kernel H from the kernel cache 332.

The summation circuit 334 outputs the sum of the multiplication output value MUL and the accumulated value from the bottom-adjacent MAC circuit (e.g., 200-0). The output of the summation circuit 334 is input to the summation circuit of the top-adjacent MAC circuit (e.g., 201-0). For the MAC circuits of row 0, the accumulated value input to the summation circuit could be initialized as either zero or a bias value. For the MAC circuits of the topmost row m, the output of the summation circuit is output to the global memory 102, accumulators (e.g., 224-0), or an OAFU (e.g., 222-0) because there are no MAC circuits above the MAC circuits of row m.

The array 106 can be part of a CNN such that the data X input to the MAC circuits of the array 106 can be data of an input feature map (IFM) and the data output from the array 106 can be data of an output feature map (OFM). The output of the array 106 for a particular OFM depth index $d_2$ can be written as Equation 1:

$$Y[:,:,d_2] = \Sigma_{d_1=0}^{D_1-1} Z[:,:,d_1,d_2] = \Sigma_{d_1=0}^{D_1-1} \text{conv2d}(X[:,:,d_1], H[:,:,d_1,d_2],[S_y,S_x]) \qquad (1)$$

where: $D_1$ is the depth of activation input feature dimension (e.g., the number of IFMs); $D_2$ is the depth of activation output feature dimension (e.g., the number of OFMs); X is the rank-3 activation input indexed as $X[r,c,d_1]$ where $d_1 \in [0,D_1-1]$ is the IFM depth index, $r \in [0,H_1-1]$ and $c \in [0,W_1-1]$ are the row and column indices of a two-dimensional (2D) IFM, respectively; H is the rank-4 weights input indexed as $H[u,v,d_1,d_2]$ where $(d_1,d_2)$ points to a kernel at the intersection of IFM depth index $d_1$ and OFM depth $d_2$, and $u \in [0,F_y-1]$ and $v \in [0,F_x-1]$ are the row and column indices, respectively, of a 2D kernel, where $F_y$ is the height of the kernel and $F_x$ is the width of the kernel; $S_x$ is the stride along the columns; $S_y$ is the stride along the rows; Y is the rank-3 activation output indexed as $Y[r,c,d_2]$ where $d_2 \in [0,D_2-1]$ is the OFM depth index, and $r \in [0,H_2-1]$ and $c \in [0,W_2-1]$ are the row and column indices of the 2D OFM, respectively; and conv2d( ) is a 2D convolution operator. The convolution operation performs dot product operations as described in Equation 2:

$$Z[r,c,d_1,d_2] = \Sigma_{u=0}^{F_y-1} \Sigma_{v=0}^{F_x-1} X[S_y r+u, S_x c+v, d_1] H[u,v,d_1,d_2] \qquad (2)$$

The OFM for specific row and column indices (r,c) is described as Equation 4:

$$Y[r,c,d_2] = \Sigma_{d_1=0}^{D_1-1} \Sigma_{u=0}^{F_y-1} \Sigma_{v=0}^{F_x-1} X[S_y r+u, S_x c+v, d_1] H[u,v,d_1,d_2] \qquad (3)$$

The IFM depth $D_1$ can be divided into multiple IFM phases so that the IFM depth index $d_1$ can be expressed as Equation 4:

$$d_1 = n_i N_1 + d'_1 \quad (4)$$

where: $N_1$ is the height of the array of MAC circuits (e.g., the number of MAC circuits in each column of the array); $n_i$ is the IFM phase index $n_i \in [0, \lceil D_1/N_1 \rceil -1]$; and $d'_1$ is the row index of the array. Weights of a kernel that is beyond the IFM depth $D_1$ or OFM depth $D_2$ are constrained to be zero as shown in Equation 5:

$$H[:,:,d_1,d_2]=0: \text{ if } d_1 \geq D_1 \text{ or } d_2 \geq D_2 \quad (5)$$

Accordingly, Equation 3 can be rewritten as Equation 6:

$$Y[r,c,d_2] = \quad (6)$$

$$\sum_{n_i=0}^{\lceil D_1/N_1 \rceil -1} \sum_{u=0}^{F_y-1} \sum_{v=0}^{F_x-1} \sum_{d'_1=0}^{N_1-1} X[S_y r+u, S_x c+v, n_i N_1 + d'_1] H[u,v,$$

$$n_i N_1 + d'_1, d_2] =$$

$$\sum_{n_i=0}^{\lceil D_1/N_1 \rceil -1} \sum_{u=0}^{F_y-1} \sum_{v=0}^{F_x-1} MAC[r,c,u,v,d_2,n_i]$$

where: MAC is the rank-6 value accumulated, at a time, over $N_1$ MAC circuits along one column indexed as $MAC[r,c,u,v,d_2,n_i]$; $(d_2,n_i)$ points to all the kernels at the intersection of $IFM[n_i N_1, n_i N_1 + N_1 -1]$ and OFM depth index $d_2$; $u \in [0, F_y -1]$ and $v \in [0, F_x -1]$ are the row and column indices, respectively, of the 2D kernel; and $r \in [0, H_2 -1]$ and $c \in [0, W_2 -1]$ are the row and column indices, respectively, of the 2D OFM, where $H_2$ is the height of the OFM and $W_2$ is the width of the OFM. MAC can be expressed as shown in Equation 7:

$$MAC[r,c,u,v,d_2,n_i] = \quad (7)$$

$$\sum_{d'_1=0}^{N_1-1} X[S_y r+u, S_x c+v, n_i N_1 + d'_1] H[u,v,n_i N_1 + d'_1, d_2] =$$

$$\sum_{d'_1=0}^{N_1-1} MUL[r,c,u,v,d_2,d'_1,n_i]$$

where MUL is the output of a multiplication circuit of a MAC circuit at a time. MUL is the rank-7 value indexed as $MUL[r,c,u,v,d_2,d'_1,n_i]$ where $(n_i,d'_1,d_2)$ points to a kernel at the intersection of IFM depth index $d_1$ and OFM depth index $d_2$. MUL can be expressed as shown in Equation 8:

$$MUL[r,c,u,v,d_2,d'_1,n_i] = X[S_y r+u, S_x c+v, n_i N_1 + d'_1] H[u,v,n_i N_1 + d'_1, d_2] \quad (8)$$

Referring back to FIGS. 2 and 3, the address & control 101 is used to access kernel H from the kernel cache 332 at the index $[u,v,d_2,d'_1,n_i]$. The kernel H is multiplied with IFM data X to generate multiplication output value $MUL[r,c,u,v,d_2,d'_1,n_i]$. After all multiplication output values $MUL[r,c,u,v,d_2,d'_1,n_i]$ from each row are accumulated along the summations cascade chain in a column of MAC circuits (e.g., 200-0, 201-0, ..., 231-0) of the array 106, the topmost MAC circuit (e.g., 231-0) generates $MAC[r,c,u,v,d_2,n_i]$ at its summation output. Then the accumulators (e.g., 220-0) store MAC and perform $$\sum_{n_i=0}^{\lceil D_1/N_1 \rceil -1} \sum_{u=0}^{F_y-1} \sum_{v=0}^{F_x-1} MAC[r,c,u,v,d_2,n_i]$$

to get the final dot product value for specific row and column indices (r,c) of the OFM.

By performing multiplication operations for a different OFM depth index every MAC cycle, M parallel threads can be grouped inside one MAC circuit by timing sharing. Multiplication output value $MUL[r,c,u,v,d_2,d'_1,n_i]$ is updated sequentially every MAC cycle for a different OFM depth index $d_2$. The OFM depth $D_2$ is divided into multiple OFM phases so that the OFM depth index $d_2$ can be expressed as shown in Equation 9:

$$d_2 = n_o N_2 + d'_2 \quad (9)$$

where: $N_2$ is the width of the array of MAC circuits (e.g., the number of MAC circuits in each row of the array); $n_o$ is the OFM phase index $n_o \in [0, \lceil D_2/N_2 \rceil -1]$; and $d'_2$ is the column index of the array.

If different OFM depth indices $d_2$ have the same column index $d'_2$, it means that the MAC operations are performed in different OFM phases corresponding to the different OFM depth indices $d_2$ by MAC circuits of the column index $d'_2$. A subset of OFM phases is grouped together as an OFM pass. Multiple OFM phases are time-division multiplexed together. Because any integer number greater than one is evenly divisible by two or three, multiple OFM phase indices $n_o$ can be grouped together as an OFM pass index $p_O$ as described in Equation 10:

$$p_o = \lfloor n_o - \frac{1}{2} \rfloor \text{ if } n_o = \lceil D_2/N_2 \rceil -1 \text{ and } \lceil D_2/N_2 \rceil -1 \text{ is <1 even number}$$

$$p_o = \lfloor n_o/2 \rfloor \text{ if } n_o = \text{others} \quad (10)$$

In some implementations, an OFM pass includes two OFM phases and/or three OFM phases. If $\lceil D_2/N_2 \rceil -1$ is an odd integer number, then all OFM passes include two OFM phases. If $\lceil D_2/N_2 \rceil -1$ is an even integer number greater than one, then all OFM passes except the last OFM pass includes two OFM phases and the last OFM pass includes three OFM phases.

Figure 4:
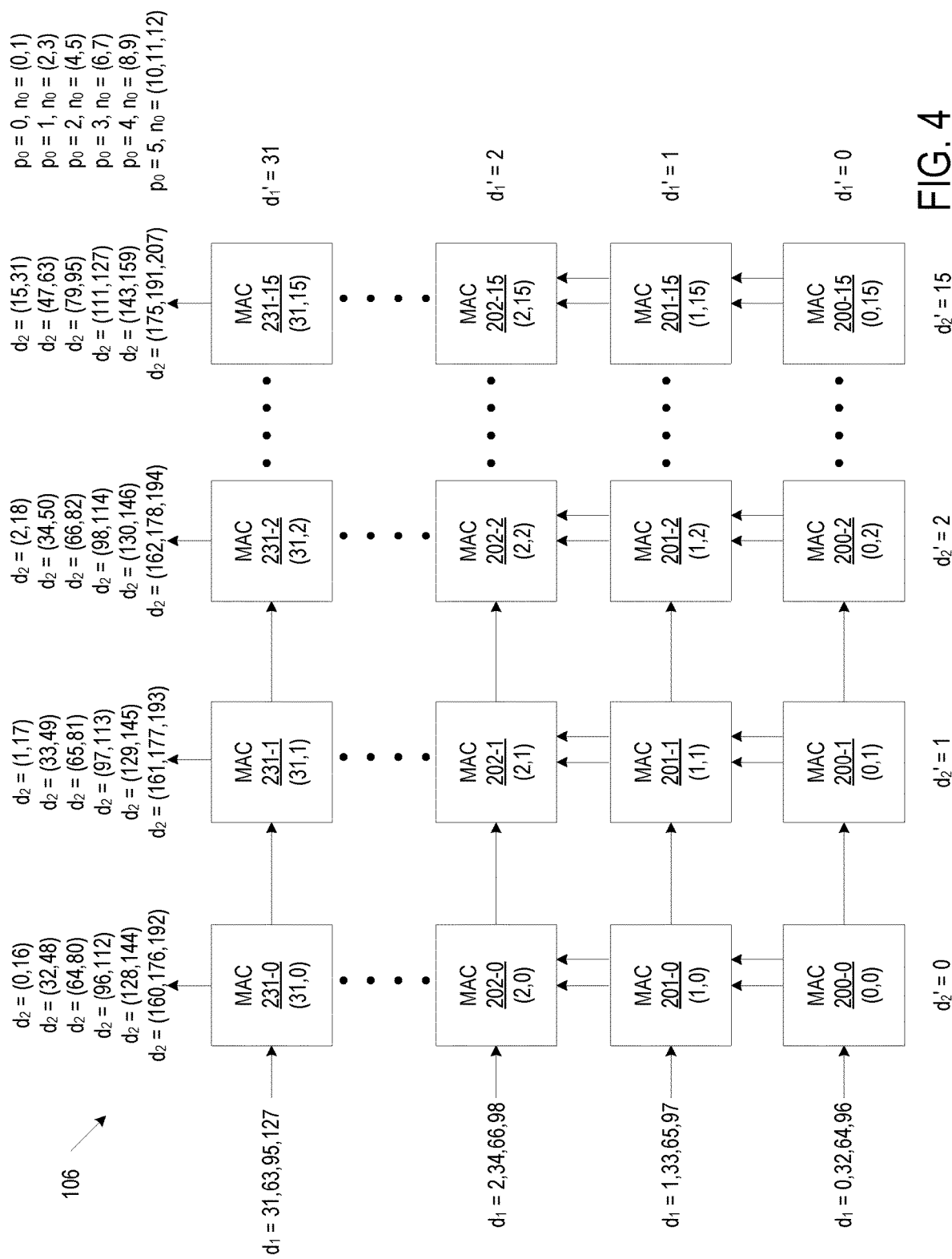
FIG. 4 shows a block diagram of the array of FIG. 2 utilizing exemplary OFM depth splitting.

FIG. 4 shows a block diagram of the array 106 of FIG. 2 utilizing exemplary OFM depth splitting. The following example is based on the parameters in Table 1 below.

TABLE 1

| Parameters | Description | Value |
| --- | --- | --- |
| $D_1$ | Number of IFMs | 128 |
| $D_2$ | Number of OFMs | 208 |
| $N_1$ | Height of array of MAC circuits | 32 |
| $N_2$ | Width of array of MAC circuits | 16 |

The number of IFM phases is $D_1/N_1$ so there are four IFM phases ($n_i \in [0,3]$). The number of OFM phases is $D_2/N_2$ so there are thirteen OFM phases ($n_o \in [0,12]$). The thirteen OFM phases are split into six OFM passes ($p_o \in [0,5]$). Because $\lceil D_2/N_2 \rceil -1$ is an even integer number greater than one (12), each of the first five OFM passes ($p_o \in [0,4]$) include two of the first ten OFM phases ($n_o \in [0,9]$). The sixth and last OFM pass ($p_o=5$) includes three OFM phases ($n_o \in [10,12]$). Thus, either two or three threads interleaved in the MAC circuits.

Each MAC circuit is generating a multiplication output value $MUL[r,c,u,v,d_2,d'_1,n_i]$ for the different OFM depth index $d_2$ in one OFM pass $p_o$ at a time. For example, the leftmost MAC circuits (e.g., 200-0 (0,0), 201-0 (1,0), 202-0 (2,0), 231-0 (31,0)) are generating multiplication output values MUL for OFM depth indices $d_2=0,16$ in the first OFM pass $p_o=0$ by repeating the pattern $MUL[r,c,u,v,0,d'_1,n_i]$, $MUL[r,c,u,v,16,d'_1,n_i]$ every two MAC cycles. $MUL[r,c,u,v,0,d'_1,n_i]$ is performed during a first one of the two MAC cycles and MUL[r,c,u,v,16,d'$_1$,n$_i$] is performed during a second one of the two MAC cycles.

The upper left corner MAC circuit 231-0 (31,0) sums the multiplication output values MUL along a single column and generates MAC output values for OFM depth indices d$_2$=0, 16 in the first OFM pass p$_o$=0 by repeating the pattern MAC[r,c,u,v,0,n$_i$], MAC[r,c,u,v,16,n$_i$] every two MAC. MAC[r,c,u,v,0,n$_i$] is performed during a first one of the two MAC cycles and MAC[r,c,u,v,16,n$_i$] is performed during a second one of the two MAC cycles. Over multiple MAC cycles, the upper left corner accumulators (e.g., 222-0) generate final dot products Y[r,c,0], Y[r,c,16] for the OFM depth indices d$_2$=0,16 in the first OFM pass p$_o$=0 in a burst of two consecutive MAC cycles by performing $\sum_{n_i=0}^{\lceil D_1/N_1 \rceil-1} \sum_{u=0}^{F_y-1} \sum_{v=0}^{F_x-1}$MAC[r,c,u,v,0,n$_i$] and $\sum_{n_i=0}^{\lceil D_1/N_1 \rceil-1} \sum_{u=0}^{F_y-1} \sum_{v=0}^{F_x-1}$MAC[r,c,u,v,16,n$_i$] for a specific row and column indices (r,c) of the OFM in time interleaved fashion.

The sequencing of $$\sum_{n_i=0}^{\lceil D_1/N_1 \rceil-1} \sum_{u=0}^{F_y-1} \sum_{v=0}^{F_x-1} MAC$$

is dependent on whether the inner loop is iterated by the row and column indices of the kernel (u,v) or the IFM phase index n$_i$. Continuing the example of FIG. 4 that has a 3×3 kernel, FIG. 5A shows the multiplication output value MUL sequence of the lower left MAC circuit 200-0 (0,0) for the first OFM pass p$_o$=0 iterated by the row and column indices (u,v) of the kernel. In contrast, FIG. 5B shows the multiplication output value MUL sequence of the lower left MAC circuit 200-0 (0,0) for the first OFM pass p$_o$=0 iterated by the IFM phase index n$_i$. FIG. 5C shows the accumulation output value MAC sequence for the upper left MAC circuit 231-0 (31,0) of the first OFM pass p$_o$=0 iterated by the row and column indices (u,v) of the kernel. In contrast, FIG. 5D shows the accumulation output value MAC sequence for the upper left MAC circuit 231-0 (31,0) of the first OFM pass p$_o$=0 iterated by the IFM phase index n$_i$.

Because the dimensions of the kernel are greater than one (F$_y$>1 and F$_x$>1) or the input activation is greater than one ($\lceil D_1/N_1 \rceil$>1), multiple MAC cycles may be needed for the top most accumulators to generate the final dot product Y[r,c,d$_2$] for specific row and column indices (r,c) of the OFM. The output valid sequence is output in a burst in which the burst length is equal to the number of OFM phases in an OFM pass. The OFM output sequence $$\sum_{n_i=0}^{\lceil D_1/N_1 \rceil-1} \sum_{u=0}^{F_y-1} \sum_{v=0}^{F_x-1} MAC[r, c, u, v, d_2, n_i]$$

is dependent on where the inner loop is iterated by the row and column indices (r,c) of the OFM or the OFM depth index d$_2$. Continuing the example of FIG. 4 that has a 7×7 OFM, FIG. 6A shows the OFM output sequence of the left most accumulators 222-0 iterated by the row and column indices (r,c) of the OFM. In contrast, FIG. 6B shows the OFM output sequence of the left most accumulators 222-0 iterated by the OFM depth index d$_2$.

Although the example of FIG. 4 shows five OFM passes including two OFM phases and a sixth OFM pass including three OFM phases, implementations of the present disclosure are not so limited. The OFM passes can include any combination of any sized groups of OFM phases. However, utilization of the MAC cycles may not be maximized. In one implementation, the thirteen OFM phases in the example of FIG. 4 can be split into seven OFM passes (p$_o$∈[0,6]), each OFM pass including two OFM phases. Two threads are interleaved in one MAC circuit. The MAC cycles are fully utilized during the first six OFM passes (p$_o$∈[0,5]) but the utilization ratio is 50% during the last OFM pass (p$_o$=6). That is, only one of the two threads are used in the last OFM pass. In another implementation, the thirteen OFM phases are split into four OFM passes (p$_0$∈[0,3]), each OFM pass including four OFM phases. The controller 108 operates at a rate that is one quarter of the MAC rate. Four threads are interleaved in one MAC circuit. The MAC cycles are fully utilized during the first three OFM passes (p$_0$∈[0,2]) but the utilization ratio is 25% during the last OFM pass (p$_0$=3). That is, only one of the four threads are used in the last OFM pass.

Figure 7:
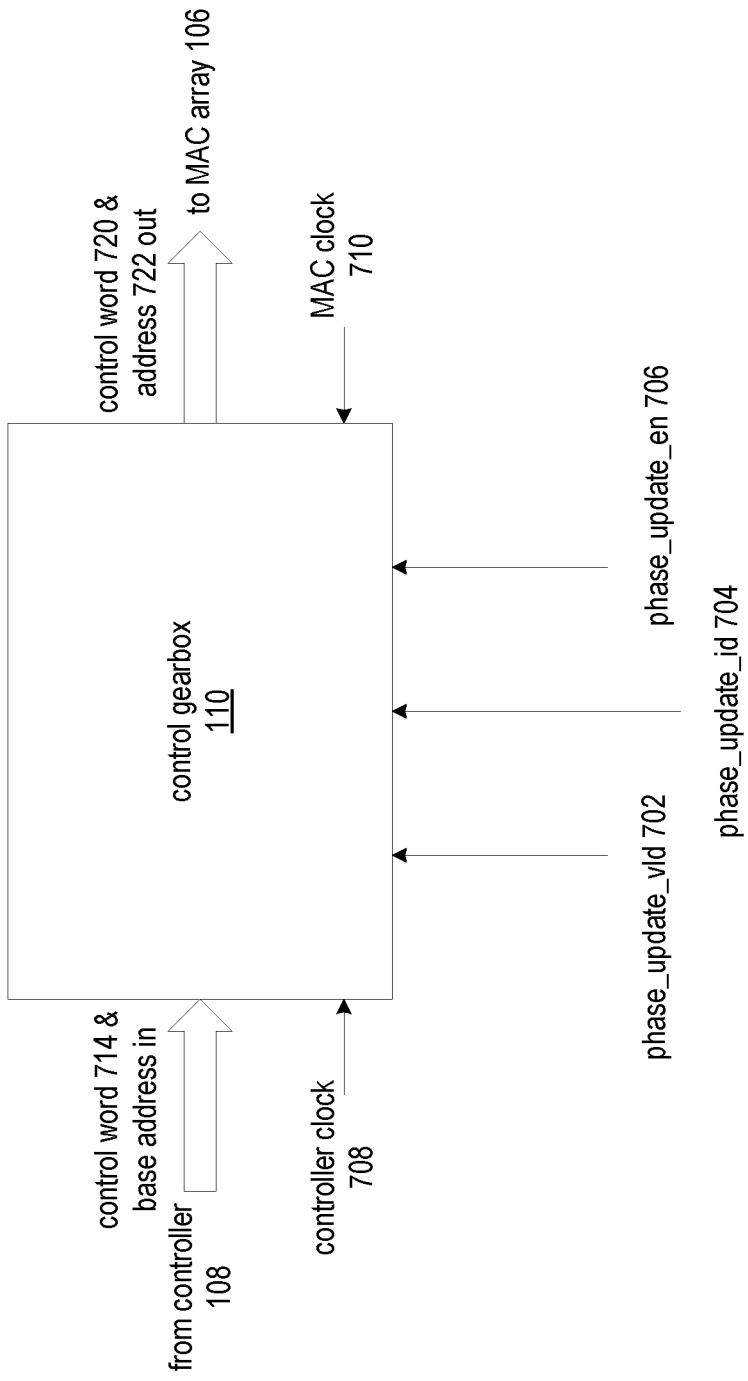
FIG. 7 shows a block diagram of an exemplary control gearbox.

FIG. 7 shows a block diagram of an exemplary control gearbox 110. The control gearbox 110 is a control circuit coupled to the controller 108 and the array 106. The control gearbox 110 provides control words 720 received from the controller 108 to the array 106 and addresses 722 for kernels stored in the cache of the MAC circuits of the array 106. Because of the potential mismatch between when a control word 720 and/or kernel address is output from the controller 108 and when the MAC circuits of the array 106 are ready for the control word 720 and/or kernel address 722, at least one implementation includes the control gearbox 110 to perform rate adaptation between the controller 108 and the array 106. The control gearbox 110 receives a signal 708 indicative of the operating frequency of the controller 108, another signal 710 indicative of the MAC rate, and input control signals from the controller 108 (e.g., phase_update_vld 702, phase_update_id 704, phase_update_en 706) that indicate when to provide a control word 720 and/or kernel address 722 to the array 106.

Referring back to the example of FIG. 4, the operating frequency of the controller 108 is half of the MAC rate. If an OFM pass includes two OFM phases, then the MAC circuits are ready for updated control words 720 every two MAC cycles. If an OFM pass includes three OFM phases, the MAC circuits are ready for updated control words 720 every three MAC cycles. Because multiple threads are interleaved in each MAC circuit during an OFM pass and the threads are processed sequentially for a particular operation at the MAC rate, the control words (e.g., write enable or read enable) for a particular operation are kept valid for multiple MAC cycles (e.g., multiple elements are read or written sequentially at the MAC rate).

The disclosed approaches include providing a control word 720 to the MAC circuits as an atomic operation having an operation period of multiple MAC cycles (e.g., two or three MAC cycles). For example, if two or three threads are interleaved in the MAC circuits at the MAC rate, then the control word 720 is updated every two or three MAC cycles. However, the controller 108 providing control words 714 to the control gearbox 108 at the operating frequency of the controller 108 is sufficient for the control gearbox 110 to provide the control words 720 to the array 106 as needed by the MAC circuits.

FIG. 7 illustrates a 3-wire control interface of the control gearbox 110. The control signals phase_update_vld 702 and phase_update_en 706 can be digital signals. The control signal phase_update_id 704 is a signal that identifies a clock cycle of the clock signal 710. As illustrated in the timing diagrams of FIGS. 10-12 (described further below), an even clock cycle of the clock signal 710 is denoted with "a" in the control signal phase_update_id 704 and an odd cycle is denoted with "b." The control signal phase_update_id 704 alternates between "a" and "b" as the MAC cycles 710 alternate between even and odd MAC cycles. The operation of the control gearbox 110 with respect to the control words can be described with the pseudo code below:

```
If (phase_update_vId = '1') and (phase_update_id = current phase) then
    If (phase_update_en = '1') then
        Update "control_out" with "control_in" and start atomic
        operation
    Else
        Force "control_out" with default value
    End if
End if
```

"Default value" refers to an internal value by default of the control gearbox that is not input to the control gearbox 110. The pseudo code is discussed further in association with FIGS. 10-12 below.

If an odd number of threads are interleaved in the MAC circuits at the MAC rate, the control gearbox 110 can update the control words 720 in either an even or odd MAC cycle alternatively after an atomic operation period. Sometimes the control words 720 are updated in an even MAC cycle (e.g., phase_update_id 704 is "a") and sometimes the control words 720 are updated in an odd MAC cycle (e.g., phase_update_id 704 is "b"). If an even number of threads are interleaved, the control words 720 are consecutively updated in an even MAC cycle (e.g., phase_update_id 704 stays "a") or in an odd MAC cycle (e.g., phase_update_id 704 stays "b").

Because of the interleaving of threads, the MAC circuits are ready for an address for a different kernel every MAC cycle (e.g., read from or written to consecutive address at the MAC rate). However, the controller 108 outputs a base address for one kernel at the operating frequency of the controller 108. To provide the MAC circuits with an address for a kernel every MAC cycle, the control gearbox 110 increments, or decrements, the base address received from the controller 108 by a fixed value depending on how the base address is mapped to the physical address of the kernel cache 332. For example, if the base address is mapped to the start address of a block data transfer, then the base address is incremented by a fixed value. If the base address is mapped to the end address of a block data transfer, then the base address is decremented by a fixed value. The addresses of the kernels are stored interleaved in the kernel cache 332 of the MAC circuits. The controller 108 generates a base address at the operating frequency of the controller 108.

Figure 8:
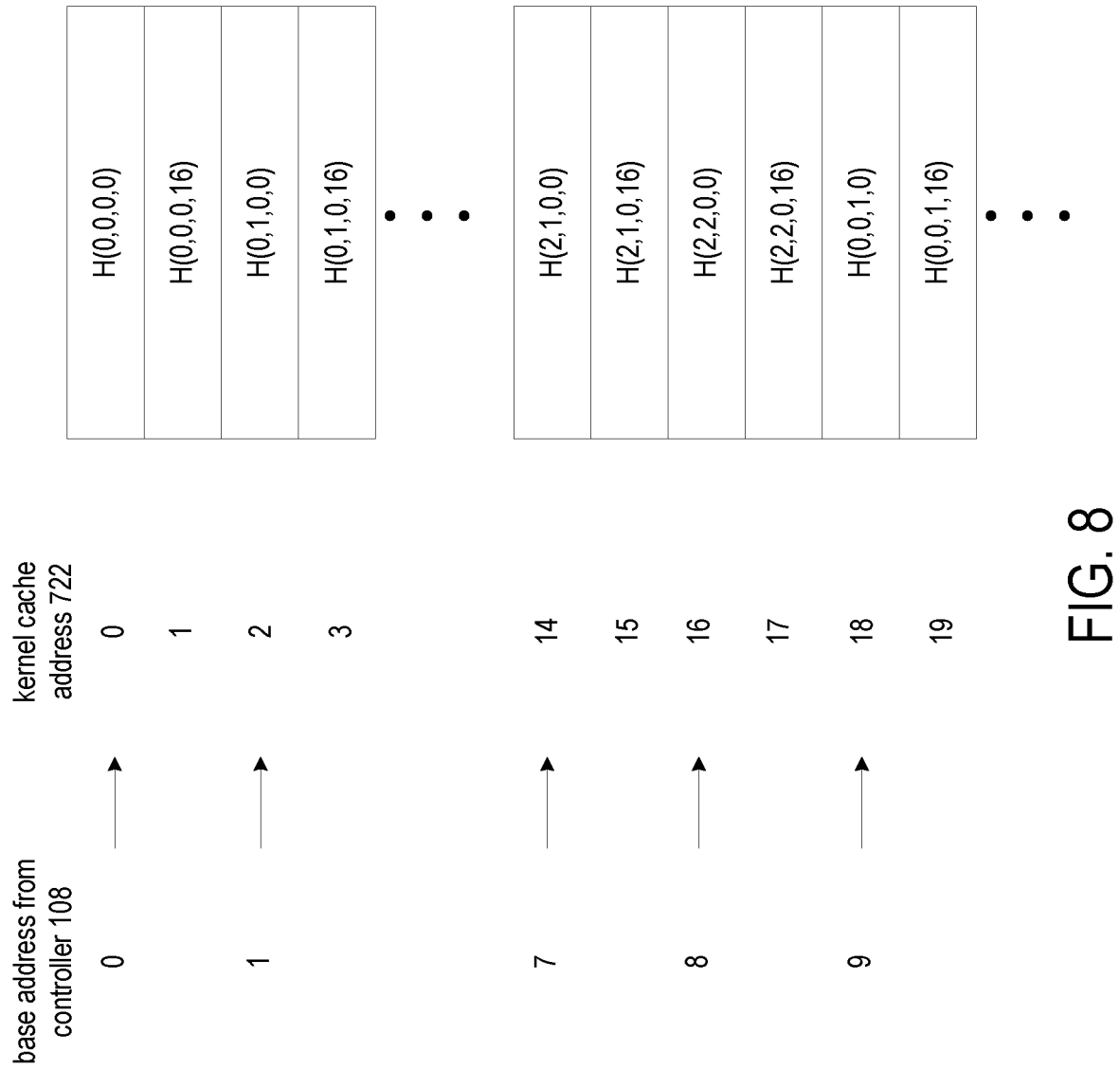
FIG. 8 shows an exemplary layout of kernel caches in the MAC circuits.

FIG. 8 shows an exemplary layout of the kernel caches in the MAC circuits. The elements of the kernels are stored interleaved in a contiguous memory space of the caches of the MAC circuits, such as the kernel cache 332 illustrated in FIG. 3. FIG. 8 illustrates the cache layout for storage of elements of the kernels corresponding to the OFM depth indices ($d_2$=0,16) of the example of FIG. 4. $H[u,v,d_1,d_2]$ points to a kernel element at row index u and column index v of a two-dimensional (2D) kernel at the intersection of IFM depth index $d_1$ and OFM depth $d_2$ ($d_1,d_2$). For example, H(0,0,0,0) points to the kernel element at row index 0 and column index 0 of the kernel at the intersection of IFM depth index 0 and OFM depth index 0. A first element of a first kernel (H(0,0,0,0)) is stored at kernel cache address 0, a first element of a second kernel (H(0,0,0,16)) is stored at kernel cache address 1, a second element of the first kernel (H(0,1,0,0)) is stored at kernel cache address 2, a second element of the second kernel (H(0,1,0,16)) is stored at kernel cache address 3, etc. The kernel cache addresses correspond to addresses 722 in FIG. 7. The OFM phases corresponding to the OFM depth indices $d_2$=0,16 are interleaved in each MAC circuit during the first OFM pass $p_o$=0. Two different kernels correspond to these two OFM depth indices, $H[u,v,n_iN_1+d'_1,0]$ and $H[u,v,n_iN_1d'_1,16]$, which are used for a respective MAC operation during two consecutive MAC cycles. However, the controller 108 does not generate a cache address of the kernel every MAC cycle to keep up with the MAC circuits at the MAC rate. Rather, the controller 108 generates a base address at the operating frequency of the controller 108 (e.g., half the MAC rate). The control gearbox 110 generates a direct mapped cache address of the kernel every MAC cycle based on the base address received from the controller 108. For the last OFM pass $p_o$=5 that includes three OFM phases, the base address is updated every three MAC cycles. However, the operating frequency of the controller 108 does not change; the controller 108 still operates at half the MAC rate.

For example, as shown in FIG. 8, the control gearbox 110 receives base address 0 for the first element of the first kernel (H(0,0,0,0)) from the controller 108. Base address 0 maps to kernel cache address 0. Prior to receiving base address 1 for the second element of the first kernel (H(0,1,0,0)) from the controller 108, the control gearbox 110 increments base address 0 by a fixed value to generate kernel cache address 1 for the first element of the second kernel (H(0,0,0,16)). Here, the fixed value is one. Then the control gearbox 110 receives base address 1 for the second element of the first kernel (H(0,1,0,0)) from the controller 108 that maps to kernel cache address 2. The control gearbox 110 repeats the incrementing for each base address received from the controller 108. The control gearbox 110 receives the base addresses at the operating rate of the controller 108, but the control gearbox 110 outputs the kernel cache addresses at the MAC rate. The control gearbox 110 generates addresses for elements of one or more other kernels so that the operating frequency of the controller 108 does not increase and the MAC rate does not decrease.

Although not shown in FIG. 8, the control gearbox 110 can generate multiple kernel cache addresses of elements of multiple kernels from a single base address. For example, in the last OFM pass $p_o$=5 the control gearbox 110 receives a first base address of a first element of a first kernel (H(0,0,0,160)) from the controller 108. Prior to receiving a second base address of the second element of the first kernel (H(0,1,0,160)), the control gearbox 110 increments the first base address by a fixed value to generate a first kernel cache address of a first element of a second kernel (H(0,0,0,176)). Also prior to receiving the second base address, the control gearbox 110 increments the first kernel cache address by the fixed value to generate a second kernel cache address of a first element of a third kernel (H(0,0,0,192)). Although the kernel cache addresses are generated by the control gearbox 110 before the next base address is received from the controller 108, the next base address can be received by the control gearbox 110 before the control gearbox 110 outputs a kernel cache address generated from a previous base address.

Figure 9:
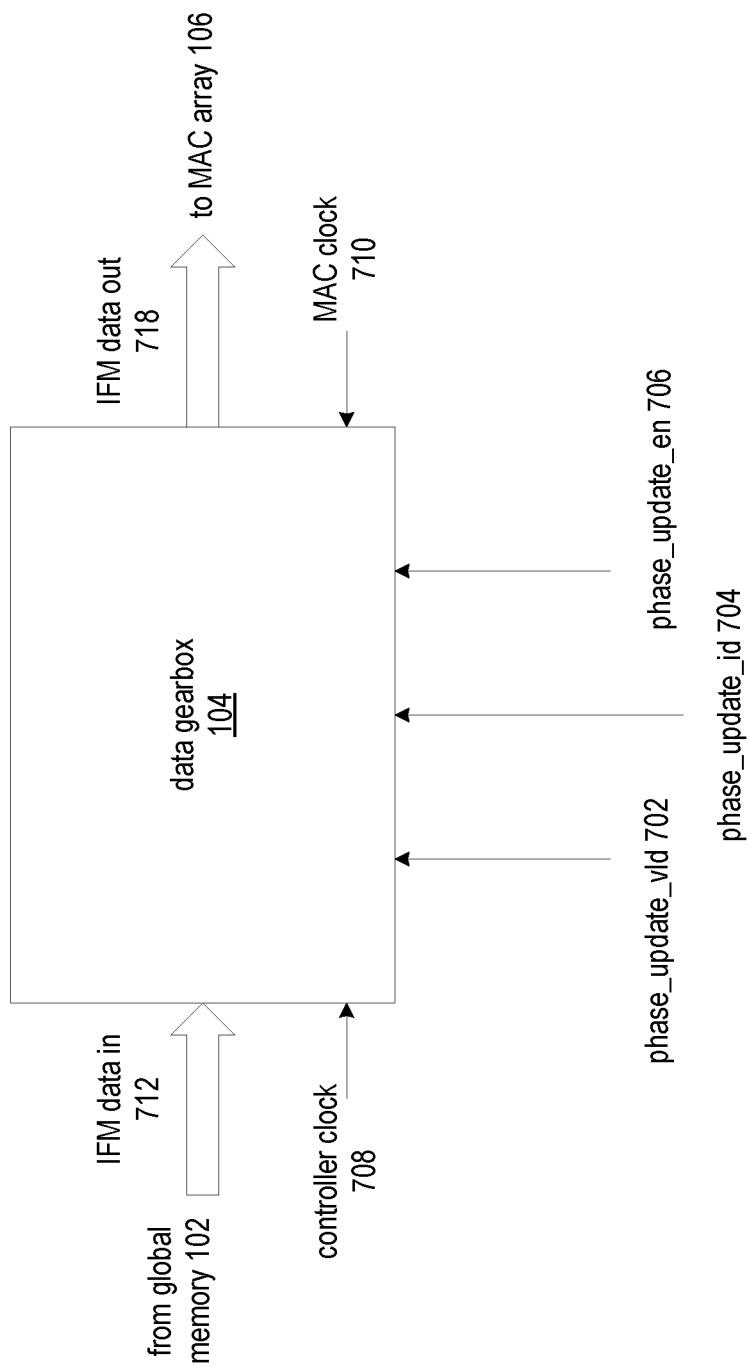
FIG. 9 shows a block diagram of an exemplary data gearbox.

FIG. 9 shows a block diagram of an exemplary data gearbox 104. As shown in FIG. 1, the data gearbox 104 is a control circuit coupled to the controller 108, the global memory 102, and the array 106. The data gearbox 104 provides data (e.g., IFM data 718) received from the global memory 102 to the MAC circuits of the array 106. Because of the potential mismatch between when IFM data 712 is output from the global memory 102 and when the MAC circuits of the array 106 are ready for the IFM data 718, at least one implementation includes the data gearbox 104 to perform rate adaptation between the controller 108, the global memory 102, and the array 106. The data gearbox 104 receives a signal 708 indicative of the operating frequency of the controller 108 and/or global memory 102, a signal 710 indicative of the MAC rate, and input control signals from the controller 108 (e.g., phase_update_vld 702, phase_update_id 704, phase_update_en 706) to determine when to provide the IFM data 718 to the array 106.

Referring back to the example of FIG. 4, the operating frequency of the controller 108 is half the MAC rate. If an OFM pass includes two OFM phases, then the MAC circuits are ready for updated IFM data 718 every two MAC cycles. If an OFM pass includes three OFM phases, then the MAC circuits are ready for updated IFM data 718 every three MAC cycles. Because multiple threads are interleaved in each MAC circuit during an OFM pass and the threads are processed sequentially for a particular operation at the MAC rate, the IFM data 718 for a particular MAC operation is kept valid for multiple MAC cycles.

The disclosed approaches include providing IFM data 718 to the MAC circuits as an atomic operation having an operation period of multiple MAC cycles (e.g., two or three MAC cycles). For example, when two or three threads are interleaved in the MAC circuits at the MAC rate, then the IFM data 718 is updated every two or three MAC cycles. However, the global memory 102 providing IFM data 712 to the data gearbox 104 at the operating frequency of the controller 108 is sufficient for the data gearbox 104 to provide the IFM data 718 to the array 106 as needed by the MAC circuits.

FIG. 9 illustrates a 3-wire control interface of the data gearbox 104. The control signals phase_update_vld 702 and phase_update_en 706 can be digital signals. The control signal phase_update_id 704 is a signal that identifies a clock cycle of the clock signal 710. As illustrated in the timing diagrams of FIGS. 10-12 (described further below), an even clock cycle of the clock signal 710 is denoted with "a" in the control signal phase_update_id 704 and an odd cycle is denoted with "b." The control signal phase_update_id 704 alternates between "a" and "b" as the MAC cycles 710 alternate between even and odd MAC cycles. The operation of the data gearbox 104 can be described with the pseudo code below:

---
If (phase_update_vId = '1') and (phase_update_id = current phase) then
   If (phase_update_en = '1') then
      Update "data_out" with "data_in" and start atomic operation
   Else
      Force "data_out" with default value
   End if
End if
---

"Default value" refers to an internal value by default that is not input to the data gearbox 104. The pseudo code is discussed further in association with FIGS. 10-12 below.

If an odd number of threads are interleaved in the MAC circuits at the MAC rate, the data gearbox 104 can update the IFM data 718 in either an even or odd MAC cycle alternatively after an atomic operation period. Sometimes the IFM data 718 is updated in an even MAC cycle (e.g., phase_update_id 704 is "a") and sometimes the IFM data 718 is updated in an odd MAC cycle (e.g., phase_update_id 704 is "b"). If an even number of threads are interleaved, the IFM data 718 is consecutively updated in an even MAC cycle (e.g., phase_update_id 704 stays "a") or in an odd MAC cycle (e.g., phase_update_id 704 stays "b").

Figure 10:
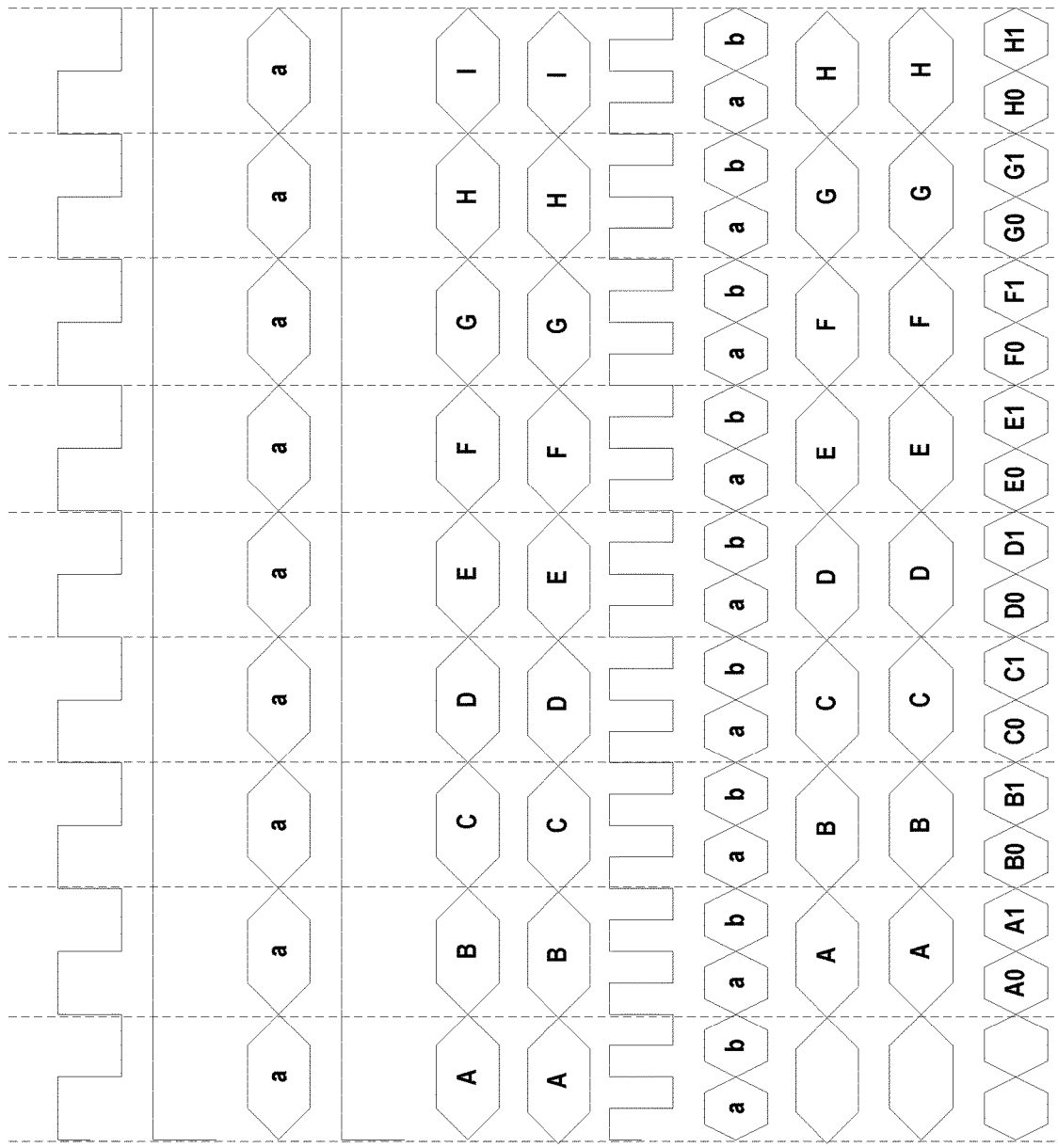
FIG. 10 shows an exemplary timing diagram of the circuit arrangement of FIG. 1 where the OFM passes include two OFM phases.

FIG. 10 shows an exemplary timing diagram of the circuit arrangement of FIG. 1 where the OFM passes include two OFM phases. The operating frequency 708 of the controller 108 is half the MAC rate 710. The IFM data 712 is read from the global memory 102 and input to the data gearbox 104 at the operating frequency 708. A control word 714 is output by the controller 108 and input to the control gearbox 110 at the operating frequency 708.

According to the above pseudo code for the control gearbox 110 and the data gearbox 104 when the control signals phase_update_vld 702 and phase_update_en 706 are high, the IFM data 718 and the control words 720 are output from the data gearbox 104 and the control gearbox 110, respectively, if the identifier phase_id 716 associated with MAC cycle 710 matches the control signal phase_update_id 704. In FIG. 10, the control signals phase_update_vld 702 and phase_update_en 706 are high (e.g., logic "1") and the control signal phase_update_id 704 consecutively indicates "a" (e.g., even MAC cycles). Accordingly, the IFM data 718 and the control words 720 are output from the data gearbox 104 and the control gearbox 110, respectively, during an MAC cycle 710 associated with "a."

Because the OFM passes in FIG. 10 include two OFM phases, addresses 722 for two kernels are needed for each OFM pass. The kernel address A0 is a kernel cache address (e.g., kernel cache address 0 illustrated in FIG. 8), which can be the same as the base address (e.g., base address 0) generated by the controller 108. The kernel address A1 is a kernel cache address generated, by the control gearbox 110, from the base address corresponding to the kernel address A0.

The kernel address A0 is of a first kernel for a first OFM depth index of a first OFM pass and the kernel address A1 is of a second kernel for a second OFM depth index of the first OFM pass that are used for the MAC operations performed on IFM data A during the first OFM pass. The kernel address B0 is of a third kernel for a first OFM depth index of a second OFM pass and the kernel address B1 is of a kernel for a second OFM depth index of the second OFM pass that are used for the MAC operations on IFM data B during the second OFM pass.

Figure 11:
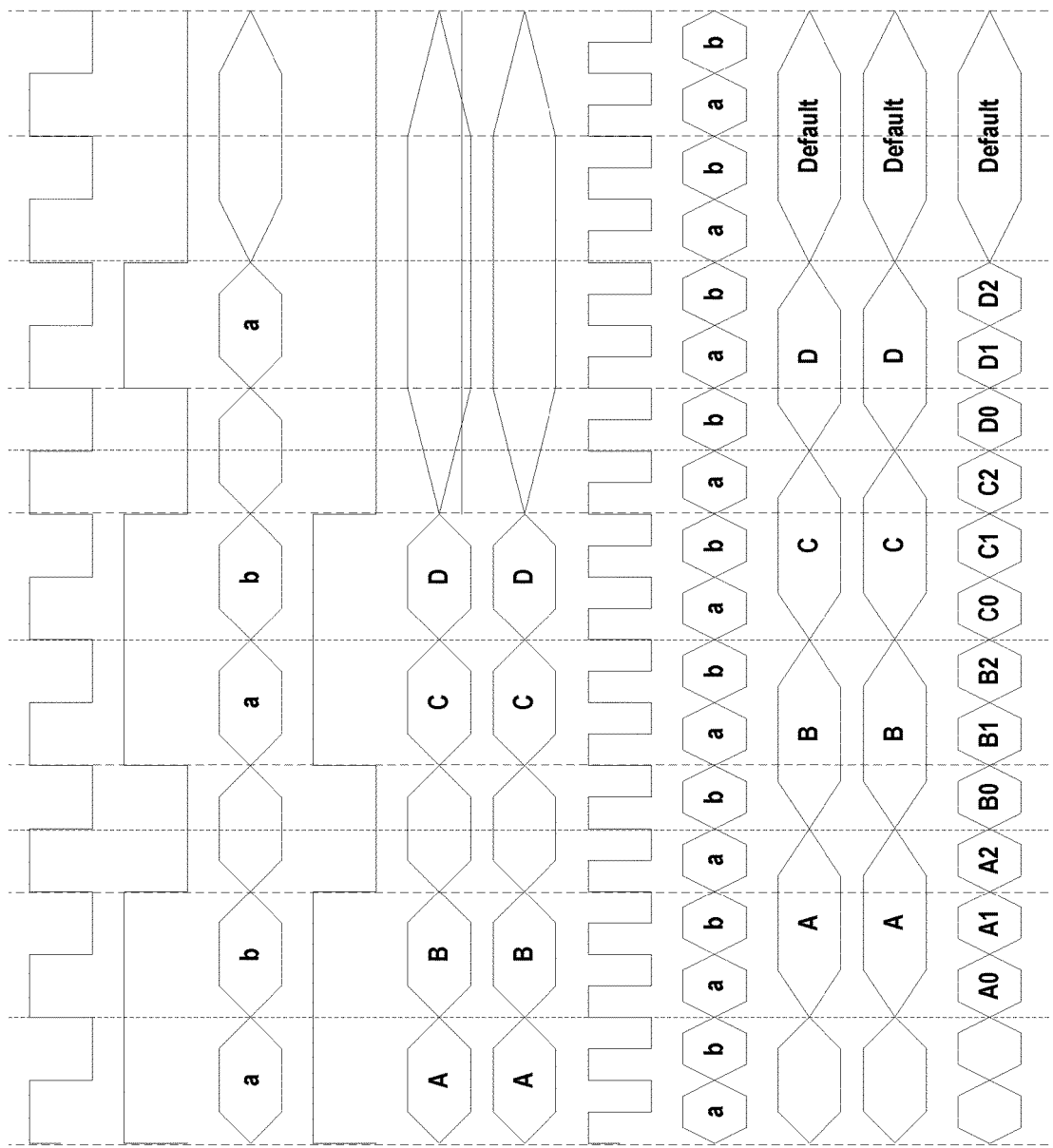
FIG. 11 shows an exemplary timing diagram of the circuit arrangement of FIG. 1 where the OFM passes include three OFM phases.

FIG. 11 shows an exemplary timing diagram of the circuit arrangement of FIG. 1 where the OFM passes include three OFM phases. According to the above pseudo code for the control gearbox 110 and the data gearbox 104 if the control signals phase_update_vld 702 and phase_update_en 706 are high, the IFM data 718 and the control words 720 is output from the data gearbox 104 and the control gearbox 110, respectively, if the identifier phase_id 716 associated with a MAC cycle 710 matches the control signal phase_update_id 704.

In FIG. 11, the control signals phase_update_vld 702 and phase_update_en 706 are initially high (e.g., logic "1"). The control signal phase_update_id 704 initially indicates "a" (e.g., even MAC cycle), then indicates "b" (e.g., odd MAC cycle), and then is do not care. Because the OFM passes include three OFM phases, the controller 108 causes IFM data 712 to be read from the global memory 102 during two consecutive operating cycles 708 of the controller 108 and then holds for one cycle. Because the control signal phase_update_id 704 initially indicates "a," the IFM data A and the control word A are output from the data gearbox 104 and the control gearbox 110, respectively, during a MAC cycle 710 associated with "a." In contrast to FIG. 10, because the control signal phase_update_id 704 then indicates "b," the IFM data B and the control word B are output from the data gearbox 104 and the control gearbox 110, respectively, during a MAC cycle 710 associated with "b." As a result, the IFM data A and the control word A remain valid for three MAC cycles 710 instead of two clock cycles as shown in FIG. 10 because outputting the IFM data B and the control word B is delayed until the identifier of a MAC cycle 710 is "b." The IFM data C and the control word C are output during a MAC cycle 710 associated with "a" and the IFM data D and the control word D are output during a MAC 710 associated with "b."

Because the OFM passes in FIG. 11 include three OFM phases, addresses for three kernels are needed for each OFM pass. The kernel address A0 is a kernel cache address (e.g., kernel cache address 0 illustrated in FIG. 8), which can be the same as the base address (e.g., base address 0) generated by the controller 108. The kernel addresses A1 and A2 are kernel cache addresses generated, by the control gearbox 110, from the base address corresponding to the kernel address A0.

The kernel address A0 is of a first kernel for a first OFM depth index of a first OFM pass, the kernel address A1 is of a second kernel for a second OFM depth index of the first OFM pass, and the kernel address A2 is of a third kernel for a third OFM depth index of the first OFM pass that are used for the MAC operations performed on IFM data A during the first OFM pass. The kernel address B0 is of a first kernel for a first OFM depth index of a second OFM pass, the kernel address B1 is of a second kernel for a second OFM depth index of the second OFM pass, and the kernel address B2 is of a third kernel for a third OFM depth index of the second OFM pass that are used for the MAC operations on IFM data B during the second OFM pass.

When the control signals phase_update_vld 702 and phase_update_en 706 are low (e.g., logic "0"), default data is output by the data gearbox 104 and the control gearbox 110.

Figure 12:
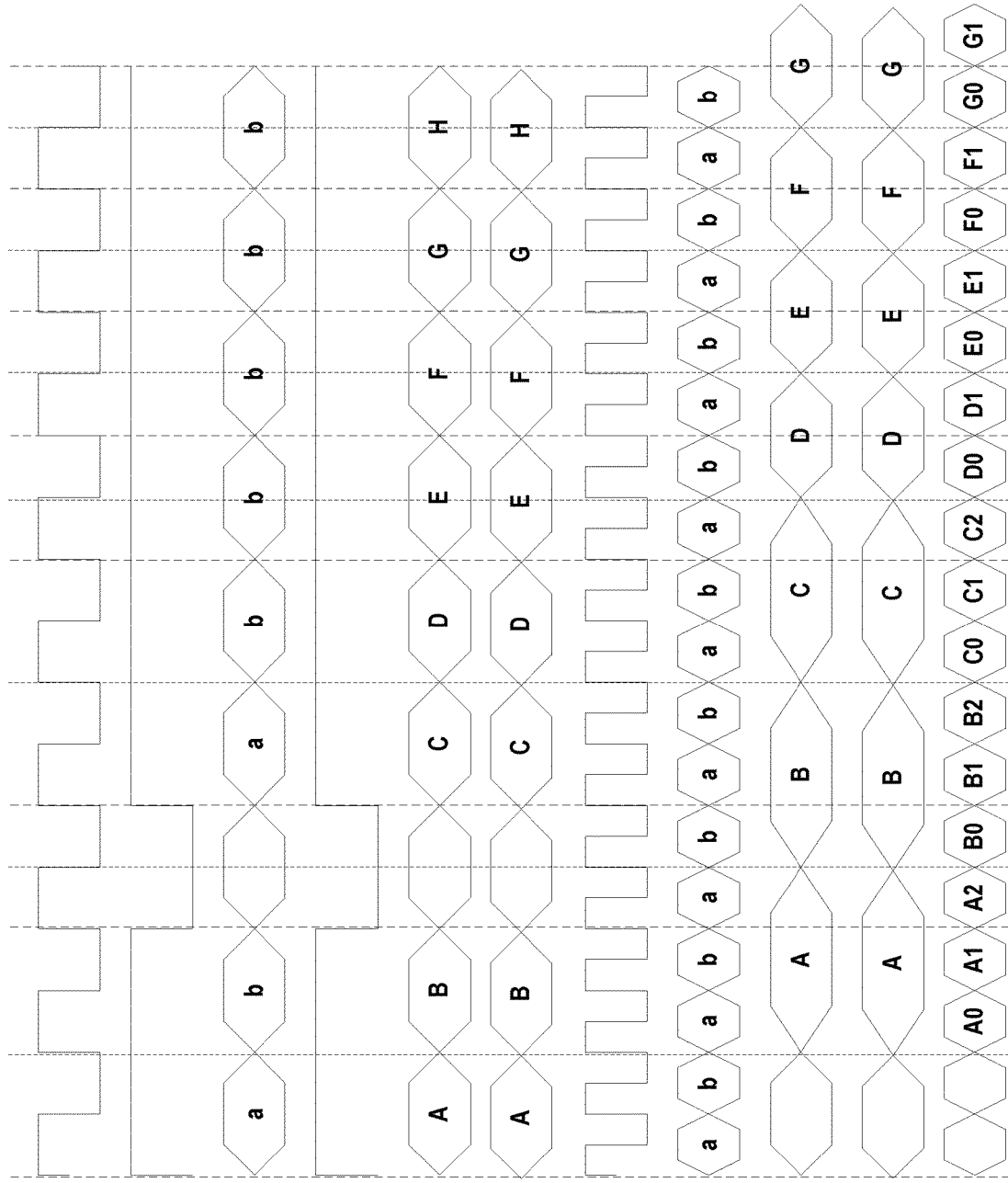
FIG. 12 shows an exemplary timing diagram of the circuit arrangement of FIG. 1 where the OFM passes switch from including three OFM phases to including two OFM phases.

FIG. 12 shows an exemplary timing diagram of the circuit arrangement of FIG. 1 where the OFM passes switch from including three OFM phases to including two OFM phases. The first three OFM passes include three OFM phases. The IFM data A and the control word A are output from the data gearbox 104 and the control gearbox 110, respectively, during a MAC cycle 710 associated with "a." The IFM data B and the control word B are output from the data gearbox 104 and the control gearbox 110, respectively, during a MAC cycle 710 associated with "b." The IFM data C and the control word C are output during a MAC 710 associated with "a."

The last four OFM passes include two OFM phases. Accordingly, when the IFM data D and the control word D are input to the data gearbox 104 and the control gearbox 110, respectively, the pattern of the IFM data 712 and control words 714 input to the data gearbox 104 and the control gearbox 110, respectively, changes from being read/generated for two operating cycles 708 of the controller 108 and then holding for a cycle to being read/generated every operating cycle 708 of the controller 108. Similarly, the pattern of the control signal phase_update_id 704 changes from the "a, b, do not care" pattern associated with OFM passes including three OFM phases to a constant "b" pattern associated with OFM passes including two OFM phases. The control signal phase_update_id 704 indicates "b" constantly because when the IFM data D and the control word D were input to the data gearbox 104 and the control gearbox 110, respectively, the control signal phase_update_id 704 indicated "b."

Figure 13:
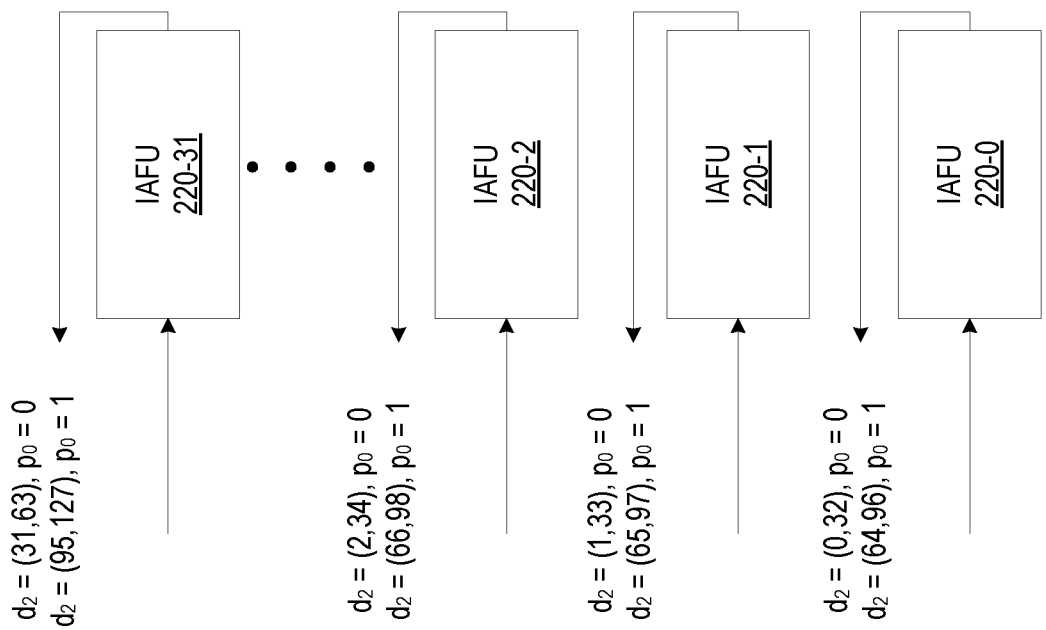
FIG. 13 shows exemplary input activation function units (IAFUs)

FIG. 13 shows exemplary input activation function units (IAFUs). If the output from an IAFU is input directly to the MAC circuits of the array 106, there is only one thread inside the IAFU of each row of the array because activation input $(X[S_y r+u, S_x c+v, n_i N_1+d'_1])$ is updated every two or three MAC cycles. If the output from an IAFU is loop-backed to the global memory 102, then the threads can be interleaved according to a similar interleaving scheme as the MAC circuits of the array. FIG. 13 shows a depth splitting example for IAFUs based on parameters in the example of FIG. 4. There are four IFM phases $n_i \in [0,3]$, and the four IFM phases are split into two IFM passes $p_i \in [0,1]$. Each IFM pass $p_o \in [0,1]$ include two IFM phases so that two IFM phases are interleaved in one IAFU. Each IAFU generates an activation function output for the different IFM depth index $(d_1)$ in one IFM pass $(p_i)$ at a time. Because activation depth is not changed after activation function being applied, the IFM input depth sequence is the same as OFM output depth sequence.

Figure 14:
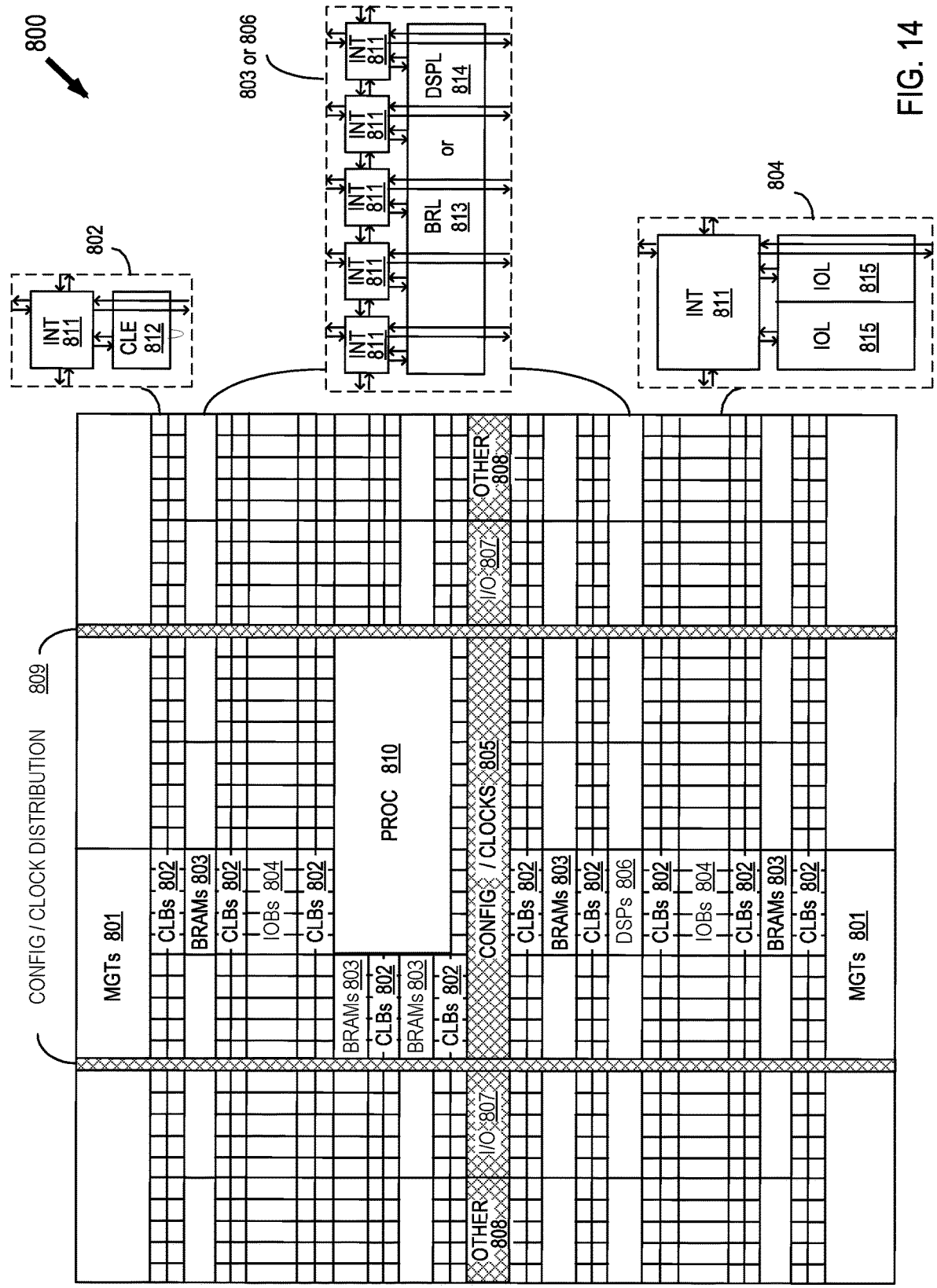
FIG. 14 shows a programmable integrated circuit (IC) on which the disclosed circuits and processes may be implemented.

FIG. 14 shows a programmable integrated circuit (IC) 800 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 14 illustrates programmable IC 800 that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some programmable IC having FPGA logic also include dedicated processor blocks (PROC) 810 and internal and external reconfiguration ports (not shown).

In some FPGA logic, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA logic. The programmable interconnect element INT 811 also includes the connections to and from the programmable logic element within the same tile, as shown by the examples included at the top of FIG. 14.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 806 can include a DSP logic element (DSPL) 814 in addition to an appropriate number of programmable interconnect elements. An IOB 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

A columnar area near the center of the die (shown shaded in FIG. 14) is used for configuration, clock, and other control logic. Horizontal areas 809 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 14 include additional logic blocks that disrupt the regular columnar structure making up a large part of the programmable IC. The additional logic blocks can be programmable blocks and/or dedicated logic. For example, the processor block PROC 810 shown in FIG. 14 spans several columns of CLBs and BRAMs.

Note that FIG. 14 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 14 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for formatting data for performing convolution operations. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement, comprising:
an array of multiply-and-accumulate (MAC) circuits, wherein each MAC circuit includes a cache configured for storage of a plurality of kernels, and the MAC circuits are configured to:
receive a first set of data elements of an input feature map (IFM) at a first rate;
perform first MAC operations on the first set of the data elements and a first one of the kernels (H) associated with a first output feature map (OFM) depth index ($d_2$) during a first MAC cycle, wherein a rate of MAC cycles is faster than the first rate; and
perform second MAC operations on the first set of the data elements and a second one of the kernels (H) associated with a second OFM depth index ($d_2$) during a second MAC cycle that consecutively follows the first MAC cycle.

2. The circuit arrangement of claim 1, further comprising a control circuit coupled to the array and configured to:
receive a first address of the first kernel in the cache;
generate a second address of the second kernel in the cache based on the first address;
provide the first address to the MAC circuits during the first MAC cycle; and
provide the second address to the MAC circuits during the second MAC cycle.

3. The circuit arrangement of claim 2, wherein the control circuit is configured to increment the first address by a fixed value to generate the second address in response to the first address being mapped to a start address of a block data transfer.

4. The circuit arrangement of claim 2, wherein the control circuit is configured to decrement the first address by a fixed value to generate the second address in response to the first address being mapped to an end address of a block data transfer.

5. The circuit arrangement of claim 1, wherein the MAC circuits of the array are configured to perform third MAC operations on the first set of the data elements and a third one of the kernels (H) associated with a third OFM depth index ($d_2$) during a third MAC cycle that consecutively follows the second MAC cycle.

6. The circuit arrangement of claim 5, further comprising a first control circuit coupled to the array and configured to:
receive a first address of the first one of the kernels in the cache;
generate a second address of the second one of the kernels in the cache based on the first address;
generate a third address of the third one of the kernels in the cache based on the first address;
provide the first address to the MAC circuits during the first MAC cycle;
provide the second address to the MAC circuits during the second MAC cycle; and
provide the third address to the MAC circuits during the third MAC cycle.

7. The circuit arrangement of claim 6, wherein the first control circuit is configured to:
increment the first address by a fixed value to generate the second address; and
increment the second address by the fixed value to generate the third address.

8. The circuit arrangement of claim 6, further comprising a second control circuit coupled to the array and configured to:
receive the first set of the data elements of the IFM and a second set of the data elements of the IFM at an input rate that is equal to or faster than the first rate; and
delay providing the second set of the data elements to the MAC circuits by at least a MAC cycle in response to input control signals.

9. The circuit arrangement of claim 1, wherein the MAC circuits of the array are configured to:
receive a second set of the data elements of the IFM at a second rate that is slower than the first rate;
perform third MAC operations on the second set of the data elements and a third one of the kernels (H) associated with a third OFM depth index ($d_2$) during a third MAC cycle that consecutively follows the second MAC cycle;
perform fourth MAC operations on the second set of the data elements and a fourth one of the kernels (H) associated with a fourth OFM depth index ($d_2$) during a fourth MAC cycle that consecutively follows the third MAC cycle; and
perform fifth MAC operations on the second set of the data elements and a fifth one of the kernels (H) associated with a fifth OFM depth index ($d_2$) during a fifth MAC cycle that consecutively follows the fourth MAC cycle.

10. The circuit arrangement of claim 1, wherein the array includes a plurality of context switching accumulators coupled to each column of MAC circuits of the array configured to:
accumulate a stored value with an output of a MAC circuit directly coupled to the accumulators; and
initialize with the output of the MAC circuit directly coupled to the accumulators.

11. A method, comprising:
inputting a first set of data elements of an input feature map (IFM) at a first rate to an array of multiply-and-accumulate (MAC) circuits;
during a first MAC cycle, performing, by the MAC circuits, first MAC operations on the first set of the data elements and a first kernel (H) stored in a cache of the MAC circuits, wherein the first kernel is associated with a first output feature map (OFM) depth index ($d_2$), wherein a rate of MAC cycles is faster than the first rate; and
during a second MAC cycle that consecutively follows the first MAC cycle, performing, by the MAC circuits, second MAC operations on the first set of the data elements and a second kernel (H) stored in the cache of the MAC circuits, wherein the second kernel is associated with a second OFM depth index ($d_2$).

12. The method of claim 11, further comprising:
inputting a first address of the first kernel in the cache to a control circuit coupled to the array;
generating, by the control circuit, a second address of the second kernel in the cache based on the first address;
inputting the first address to the MAC circuits during the first MAC cycle; and
inputting the second address to the MAC circuits during the second MAC cycle.

13. The method of claim 12, wherein generating the second address includes incrementing the first address by a fixed value in response to the first address being mapped to a start address of a data block transfer.

14. The method of claim 12, wherein generating the second address includes decrementing the first address by a fixed value in response to the first address being mapped to an end address of a data block transfer.

15. The method of claim 11, further comprising during a third MAC cycle that consecutively follows the second MAC cycle, performing, by the MAC circuits, third MAC operations on the first set of the data elements and a third kernel (H) stored in the cache of the MAC circuits, wherein the third kernel is associated with a third OFM depth index ($d_2$).

16. The method of claim 15, further comprising:
inputting a first address of the first one of the kernels in the cache to a first control circuit coupled to the array;
generating, by the first control circuit, a second address of the second kernel in the cache based on the first address;
generating, by the first control circuit, a third address of the third kernel in the cache based on the first address;
inputting the first address to the MAC circuits during the first MAC cycle;
inputting the second address to the MAC circuits during the second MAC cycle; and
inputting the third address to the MAC circuits during the third MAC cycle.

17. The method of claim 16, wherein:
generating the second address includes incrementing the first address by a fixed value; and
generating the second address includes incrementing the second address by the fixed value.

18. The method of claim 16, further comprising:
inputting the first set of the data elements of the IFM and a second set of the data elements of the IFM to a second control circuit coupled to the array at an input rate that is equal to or faster than the first rate; and
delaying, by the second control circuit, inputting the second set of the data elements to the MAC circuits by at least a MAC cycle in response to input control signals to the second control circuit.

19. The method of claim 11, further comprising:
inputting a second set of the data elements of the IFM to the MAC circuits of the array at a second rate that is slower than the first rate;
during a third MAC cycle that consecutively follows the second MAC cycle, performing, by the MAC circuits, third MAC operations on the second set of the data elements and a third kernel (H) stored in the cache of the MAC circuits, wherein the third kernel is associated with a third OFM depth index ($d_2$);
during a fourth MAC cycle that consecutively follows the third MAC cycle, performing, by the MAC circuits, fourth MAC operations on the second set of the data elements and a fourth kernel (H) stored in the cache of the MAC circuits, wherein the fourth kernel is associated with a fourth OFM depth index ($d_2$); and
during a fifth MAC cycle that consecutively follows the fourth MAC cycle, perform, by the MAC circuits, fifth MAC operations on the second set of the data elements and a fifth kernel (H) stored in the cache of the MAC circuits, wherein the fifth kernel is associated with a fifth OFM depth index ($d_2$).

20. The method of claim 11, further comprising:
accumulating, by a plurality of context switching accumulators coupled to each column of MAC circuits of the array, a stored value with an output of a MAC circuit directly coupled to the accumulators; and
initializing the accumulators with the output of the MAC circuit directly coupled to the accumulators.

* * * * *